US00RE39805E

(19) United States
(12) Reissued Patent
Maeda et al.

(10) Patent Number: US RE39,805 E
(45) Date of Reissued Patent: Sep. 4, 2007

(54) AIR GUN

(75) Inventors: Tetsuo Maeda, Tokyo (JP); Yoshiyuki Maeda, Tokyo (JP); Yuichi Toyoda, Tokyo (JP)

(73) Assignee: Maruzen Company Limited, Tokyo (JP)

(21) Appl. No.: 11/355,309

(22) Filed: Feb. 16, 2006

Related U.S. Patent Documents

Reissue of:
(64) Patent No.: 6,026,797
Issued: Feb. 22, 2000
Appl. No.: 09/160,805
Filed: Sep. 25, 1998

(51) Int. Cl.
*F41B 11/06* (2006.01)
*F41B 11/32* (2006.01)

(52) U.S. Cl. ..... 124/74; 124/73; 124/82
(58) Field of Classification Search ..... 124/56, 124/71, 73, 74, 76, 77, 81, 82
See application file for complete search history.

(56) References Cited

U.S. PATENT DOCUMENTS 2,817,328 A * 12/1957 Gale ..... 124/11
5,476,087 A * 12/1995 Kunimoto ..... 124/73
5,505,188 A * 4/1996 Williams ..... 124/74
5,613,483 A * 3/1997 Lukas et al. ..... 124/73
5,878,736 A * 3/1999 Lotuaco, III ..... 124/71
5,884,615 A * 3/1999 Salva ..... 124/71

* cited by examiner

*Primary Examiner*—Michael J. Carone
*Assistant Examiner*—James S. Bergin
(74) *Attorney, Agent, or Firm*—Rader, Fishman & Grauer PLLC

(57) ABSTRACT

This invention can make a valve compact in function and improve using efficiency of a compressed gas and make an air gun compact. To achieve this object, an air gun is constructed by a hit pin arranged in a cylinder portion, a valve body arranged within a hollow portion of the cylinder portion and having a bullet supplying nozzle chamber and a valve pin chamber, a gas inlet port opened to a sleeve-shaped circumferential face of the valve pin chamber, a bullet supplying nozzle arranged within the bullet supplying nozzle chamber, and a valve pin arranged within the valve pin chamber. The hit pin is pressed on a muzzle side and the valve pin is slid to the muzzle side so that an airtight state between a valve pin flange portion and a side face of the valve pin chamber on its gun rear end side is released. A compressed gas is supplied to a nozzle chamber side opening and a valve pin chamber side opening from a clearance between the valve pin flange portion and the gun rear end side face of the valve pin chamber.

2 Claims, 20 Drawing Sheets

AIR GUN

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an air gun for shooting a bullet by a supplied compressed gas and performing blow-back for shooting the next bullet by moving a sliding portion backward in the air gun.

2. Description of the Background Art

A conventional air gun performing blow-back for the next bullet shoot has a compressed gas air chamber, an opening-closing valve and a switching valve. The compressed gas air chamber stores the supplied compressed gas in the air gun for shooting the bullet by the compressed gas. The opening-closing valve releases the compressed gas for shooting the bullet. The switching valve switches flow-out portions of the sent compressed gas by setting the opening-closing valve to an opening state. The opening-closing valve is arranged within a grip portion and is set to the opening state by striking a valve rod with a hammer, and supplies the compressed gas within the compressed gas air chamber. The switching valve is arranged within a slide or the grip portion and switches the flow-out portions of the supplied compressed gas by setting the opening-closing valve to be opened.

Namely, for example, an air gun shown in FIG. 19 is known as a conventional automatic type air gun using a compressed carbonic acid gas, or the air, etc.

A conventional example 1 of the conventional air gun will next be explained. Reference numeral 401 designates an air gun. In the following description, an operation of the air gun 401 will be explained from a state in which a bullet W is supported within a rubber chamber 408 and a switching valve 409 is moved backward in the air gun 401 at any time against the biasing force of a valve spring 412 until the bullet W itself is shot. First, a trigger 402 is pulled to shoot the bullet W. A hammer 403 is thus rotated in an arrow direction and presses against a valve pin 404. Since the valve pin 404 is pressed, a valve 406 is set to an opening state so that a compressed gas stored in an accumulating pressure chamber 405 is flowed into the side of a slide 407 through the valve 406. At this time, the switching valve 409 closes the side of a cylinder 413 so as not to flow-out the compressed gas to the side of the cylinder 413. The compressed gas flowed into the side of the slide 407 is flowed into a side of the bullet W within the rubber chamber 408 and pushes-out the bullet W and forcibly shoots the bullet W from a muzzle through the interior of an outer barrel 410.

After the bullet W is shot, there is no bullet W in the rubber chamber 408 so that the switching valve 409 is pushed back to an unillustrated muzzle side by the biasing force of the valve spring 412 and the flow-out of the compressed gas onto the unillustrated muzzle side is stopped and the cylinder side is set to an opening state. Accordingly, the compressed gas prevented from being flowed-out onto the muzzle side is flowed into the cylinder 413 and moves the cylinder 413 and the slide 407 backward in the air gun 401 against the biasing force of a slide spring 414 so that the hammer 403 is inclined backward. Further, when the compressed gas is returned to the muzzle side, an end tip of the slide 407 on its muzzle side pushes the next bullet supplied from a bullet storage 411 so that the rubber chamber 408 is charged with this bullet and the next bullet shoot is prepared.

In contrast to this, there is a second conventional example of the conventional air gun as explained in the following description based on FIG. 20.

Reference numeral 501 designates an air gun. An operation of the air gun 501 will next be explained from a state in which a bullet W is supported within a charging packing 508. A switching valve 509 in this second conventional example differs from that in the first conventional example as follows. Namely, in a state in which the charging packing 508 is charged with the bullet W, a compressed gas unpressed by the bullet and accumulated in an accumulating pressure chamber 505 in a normal state can be flowed out to a side of the bullet W charged in the charging packing 509 and is not flowed out to the side of a cylinder 513. When the compressed gas is rapidly flowed out to an unillustrated muzzle side after the bullet W is shot, the switching valve 509 is moved in a muzzle direction by a negative pressure of the compressed gas and closes the side of a piston block 507 and opens the side of the cylinder 513 such that the compressed gas is flowed out to the side of the cylinder 513.

First, a trigger 502 is pulled to shoot the bullet W. Thus, a hammer 503 is rotated in an arrow direction and presses against a valve rod 504. Since the valve rod 504 is pressed, a valve 506 is set to an opening state and the compressed gas stored in the accumulating pressure chamber 505 is flowed into the side of the piston block 507 through the valve 506. In the piston block 507, the switching valve 509 sets a side of the charging packing 508 to an opening state by the biasing force of a spring 512, and a rear side end portion of the switching valve 509 in the air gun 501 closes the side of the cylinder 513. Accordingly, the compressed gas flowed into the side of the piston block 507 is flowed into a side of the bullet W within the charging packing 508 and pushes out the bullet W so that this bullet is forcibly shot from the muzzle through the interior of an outer barrel 510.

After the bullet W is shot, there is no bullet W in the charging packing 508 so that the compressed gas is rapidly flowed to the side of the charging packing 508 and the switching valve 509 is pushed back to the unillustrated muzzle side against the biasing force of the valve spring 512 by a negative pressure caused by the flow of the compressed gas. Thus, flow-out of the compressed gas to the unillustrated muzzle side is stopped. Accordingly, the compressed gas prevented from being flowed-out to the muzzle side is flowed into the piston block 507 and moves the piston block 507 backward in the air gun 501 so that the hammer 503 is inclined backward. Further, when the compressed gas is returned to the muzzle side, an end tip of the piston block 507 on its muzzle side pushes the next bullet supplied from a bullet storage 511 so that the charging packing 508 is charged with this bullet and shooting of the next bullet is prepared.

As mentioned above, in the conventional air gun, the next gun is automatically supplied by switching a state in which the compressed gas is flowed-out to the muzzle side within a slide slidably arranged from the muzzle side to a gun rear end in an upper portion of the air gun, or is flowed-out to the gun rear end. However, the switching valve for switching flow paths of the compressed gas is arranged within the slide slidable in the upper portion of the air gun.

Further, other conventional air guns using the compressed gas are shown in U.S. Pat. Nos. 2,817,328 and 5,476,087. Each of these air guns separately has a valve for discharging the compressed gas for shooting a bullet and a mechanism for charging the gun with the bullet and preparing shooting of the next bullet.

As mentioned above, the opening-closing valve for supplying the compressed gas and the switching valve or mechanism are separately arranged in the conventional method. This switching valve or mechanism supplies the supplied compressed gas to the charged bullet and then stops the supply of the compressed gas to a bullet side, and performs a switching operation such that the compressed gas is supplied to move the cylinder, etc. backward in the gun so as to prepare for shooting of the next bullet.

However, in accordance with the conventional method, since the opening-closing valve and the switching valve are separately arranged, the number of constructional members is increased and it is difficult to make the entire structure compact. A problem also exists in that the compressed gas is uselessly used by each valve and passage volumes of the compressed gas between the valves. Further, it is difficult to make the gun compact.

SUMMARY OF THE INVENTION

Therefore, in consideration of these problems, an object of this invention is to provide an air gun in which using efficiency of the compressed gas is improved and the air gun can be made compact by making the opening-closing valve and the switching valve compact in function.

DESCRIPTION OF THE PREFERRED EMBODIMENTS

Figure 1:
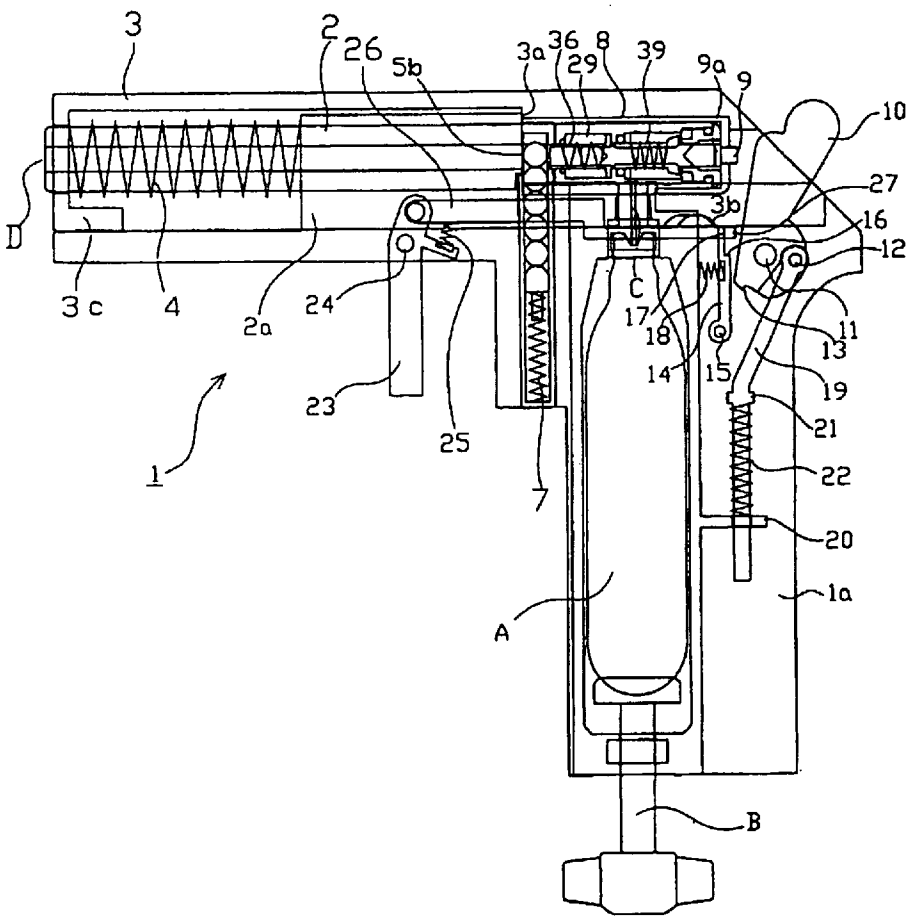
FIG. 1 is a sectional explanatory view showing an air gun in an embodiment mode of this invention.
Figure 10:
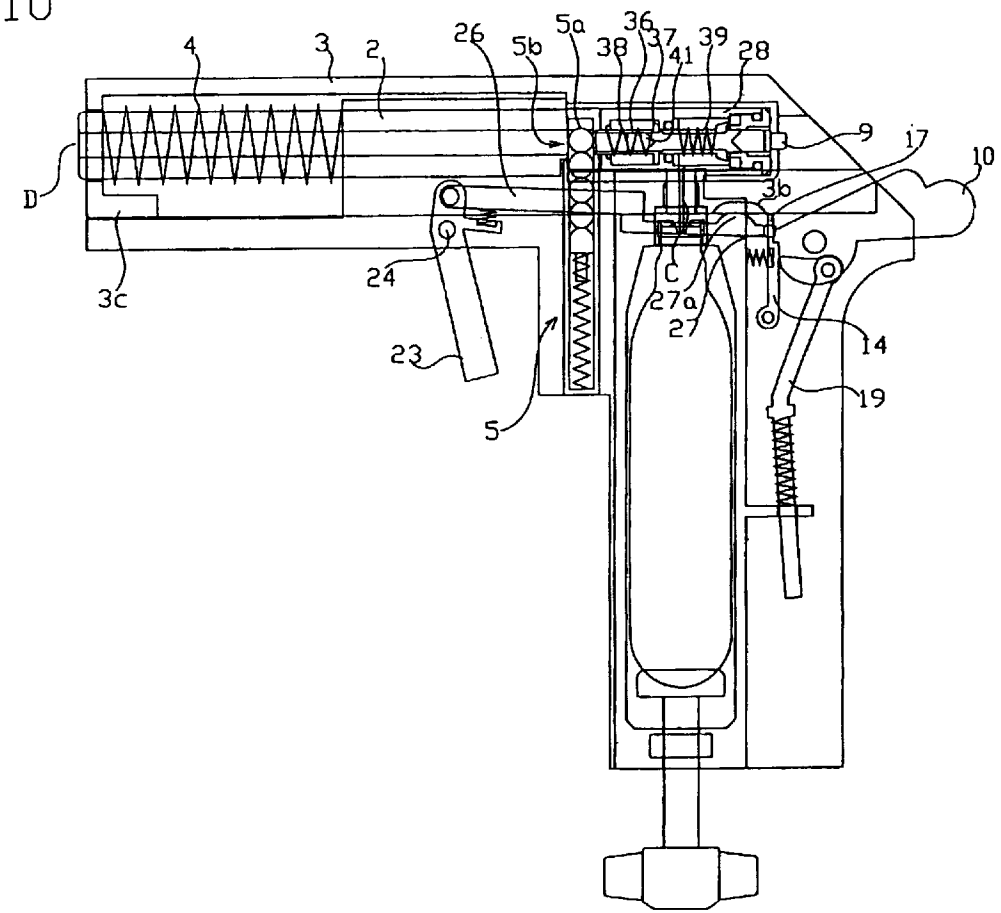
FIG. 10 is a sectional explanatory view of an operating state of the air gun.
Figure 11:
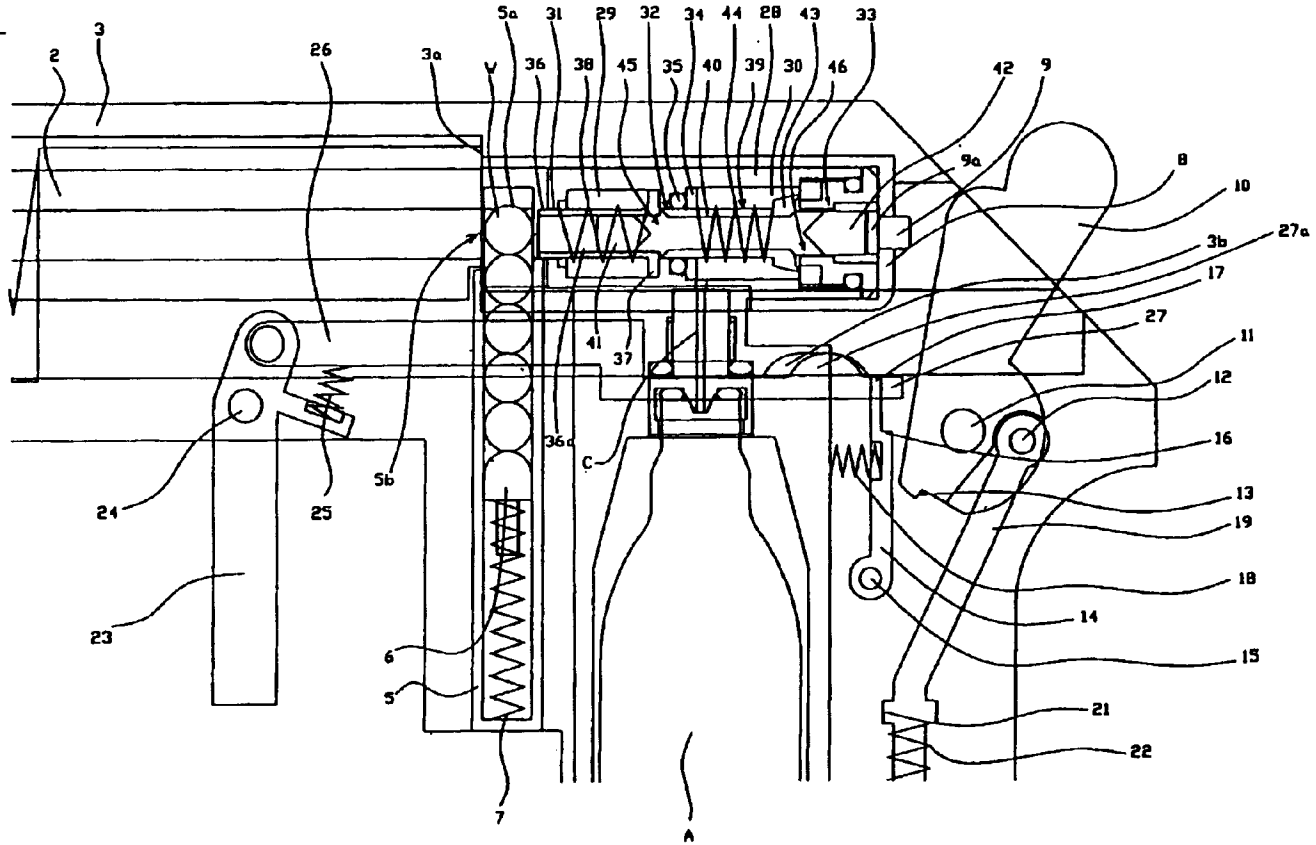
FIG. 11 is a partially enlarged sectional explanatory view of the air gun in FIG. 1.
Figure 12:
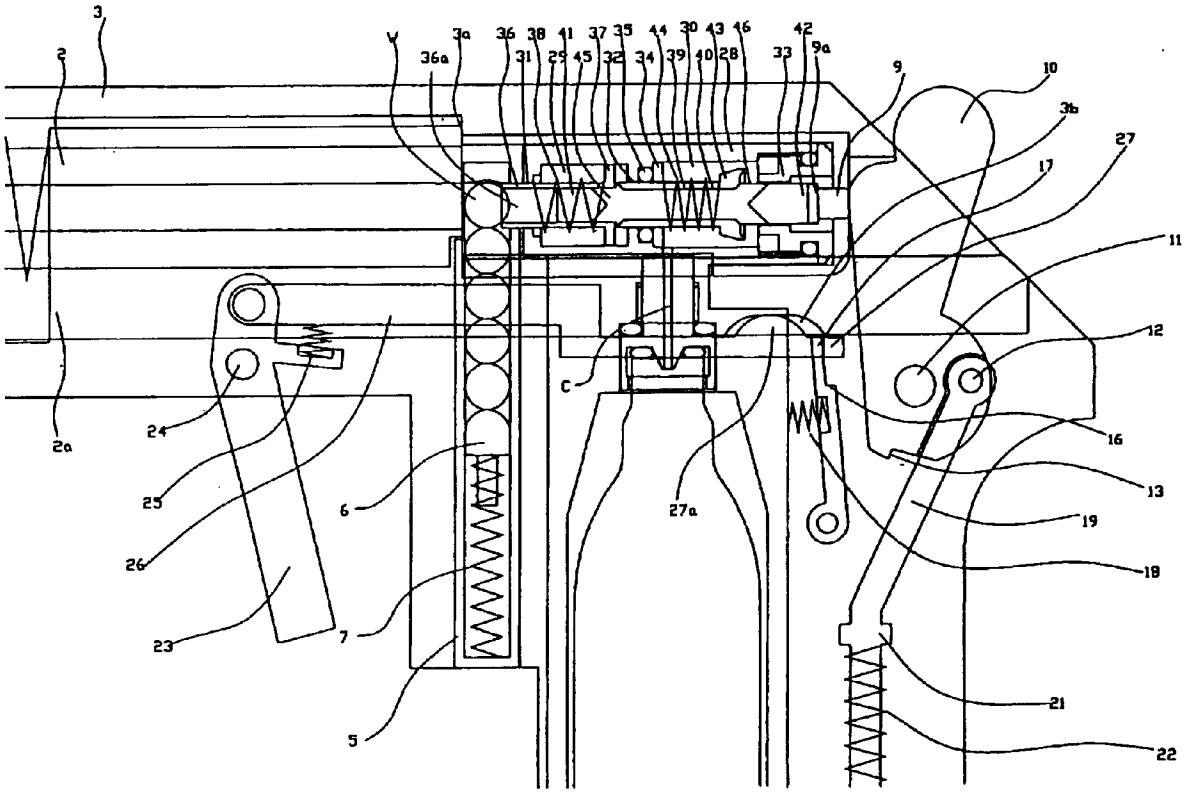
FIG. 12 is a partially enlarged sectional explanatory view of the air gun in FIG. 6.
Figure 13:
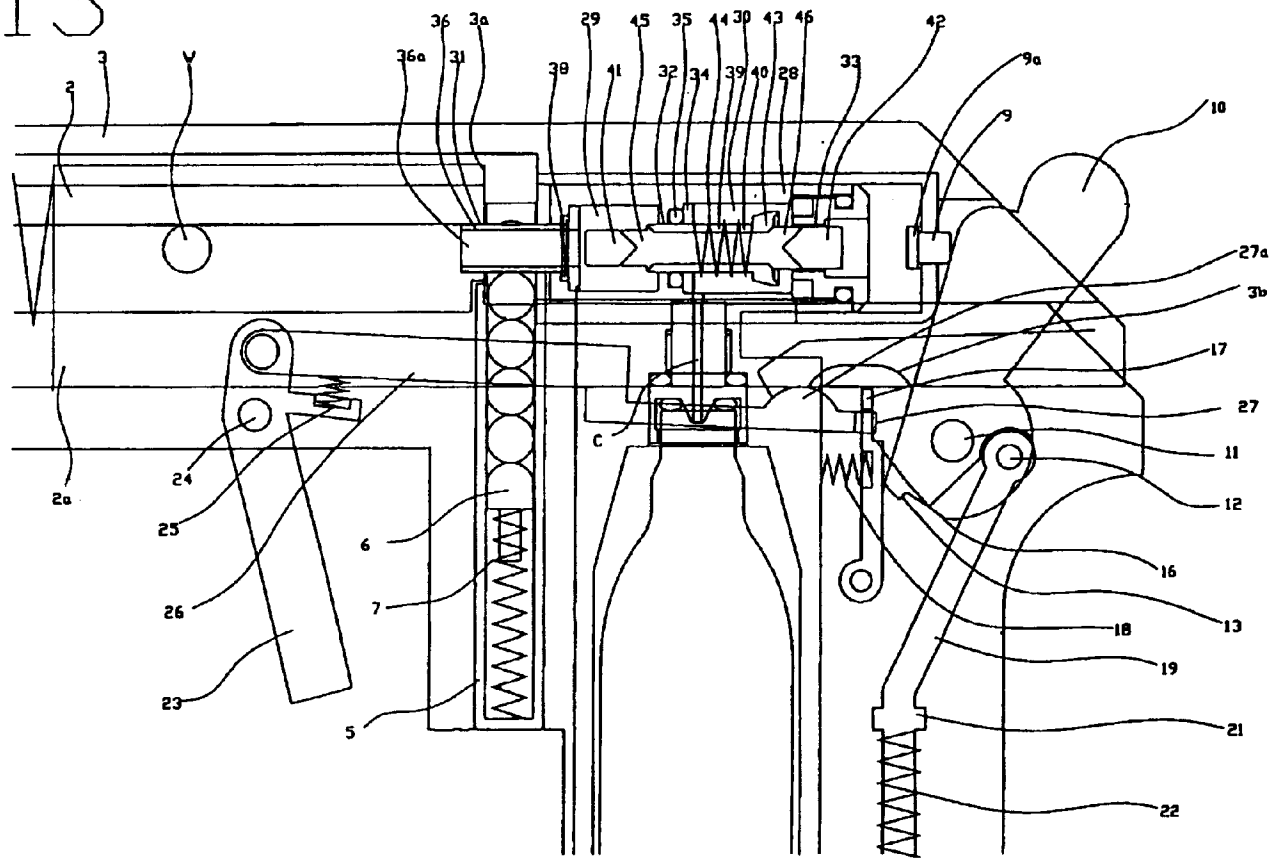
FIG. 13 is a partially enlarged sectional explanatory view of the air gun in FIG. 7.
Figure 14:
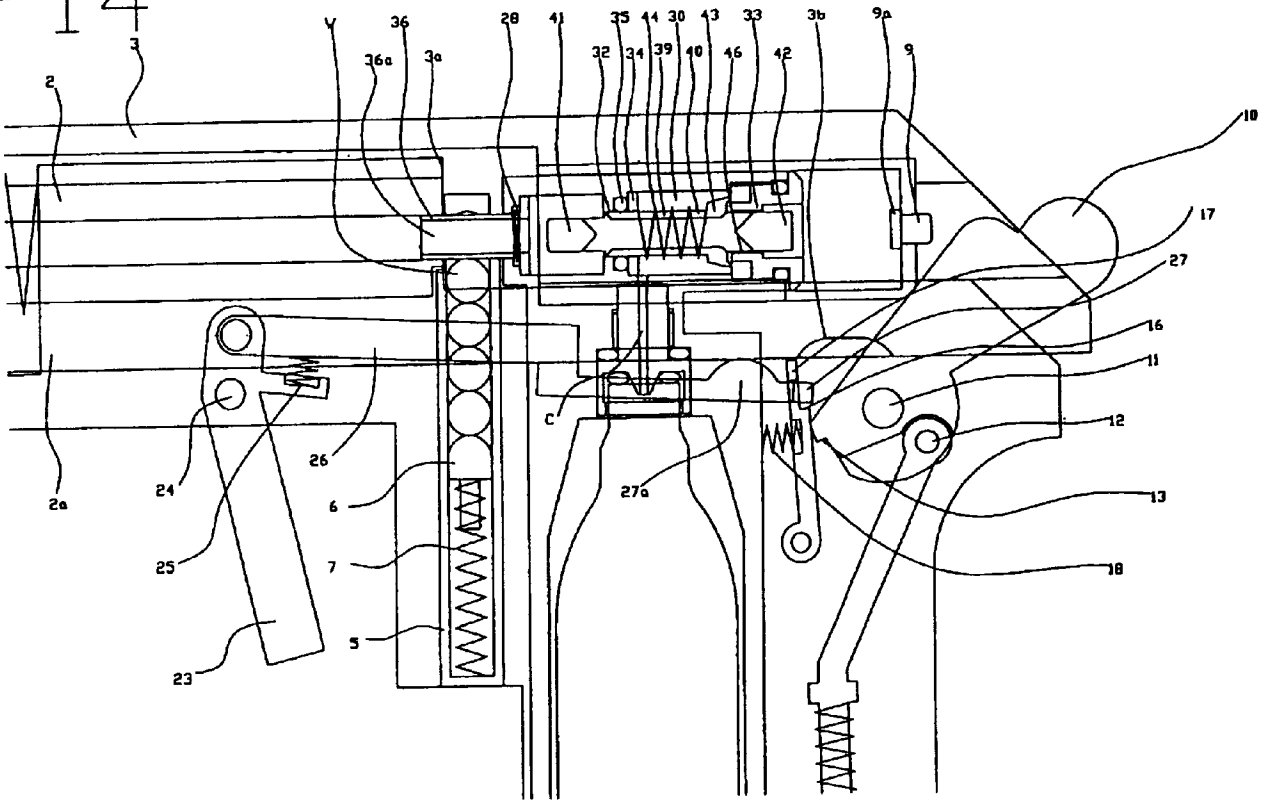
FIG. 14 is a partially enlarged sectional explanatory view of the air gun in FIG. 8.
Figure 15:
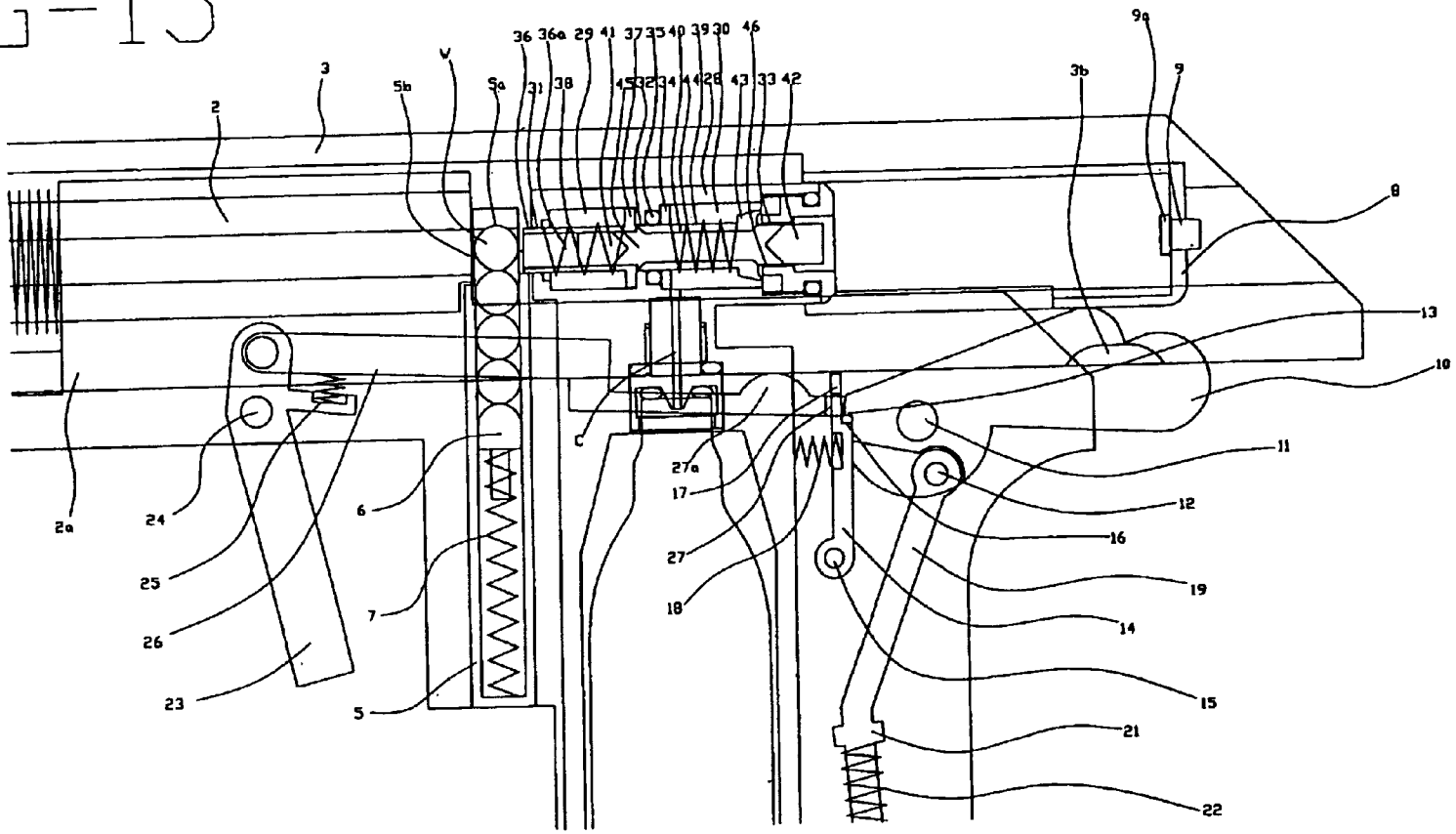
FIG. 15 is a partially enlarged sectional explanatory view of the air gun in FIG. 9.
Figure 16:
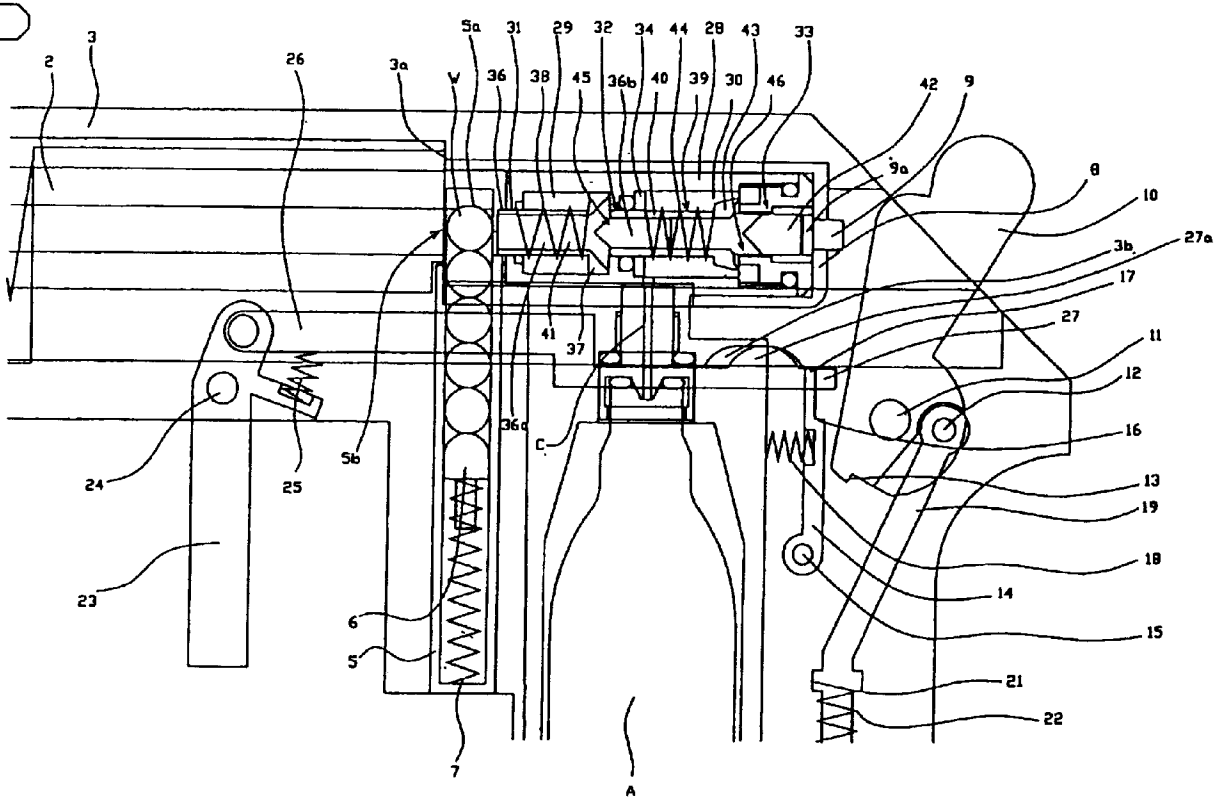
FIG. 16 is a partially enlarged sectional explanatory view of an air gun in a second embodiment mode.
Figure 17:
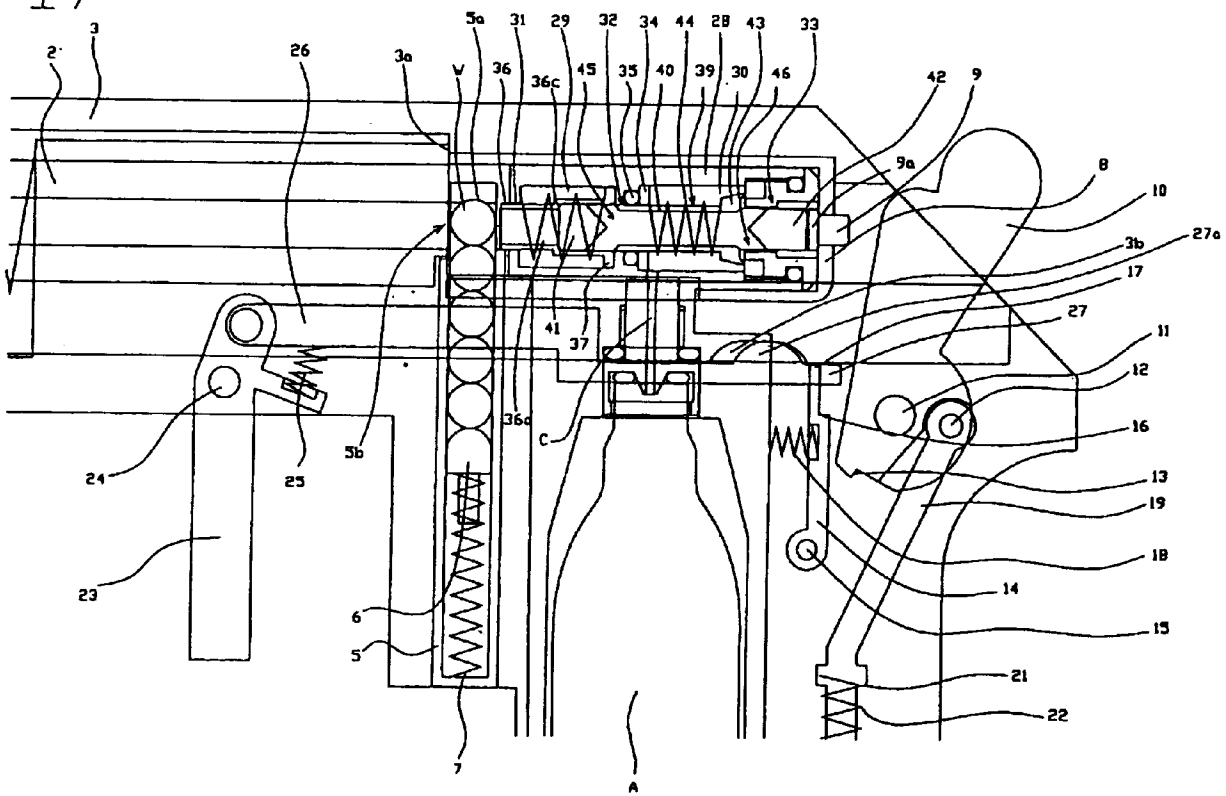
FIG. 17 is a partially enlarged sectional explanatory view of an air gun in a third embodiment mode.
Figure 18:
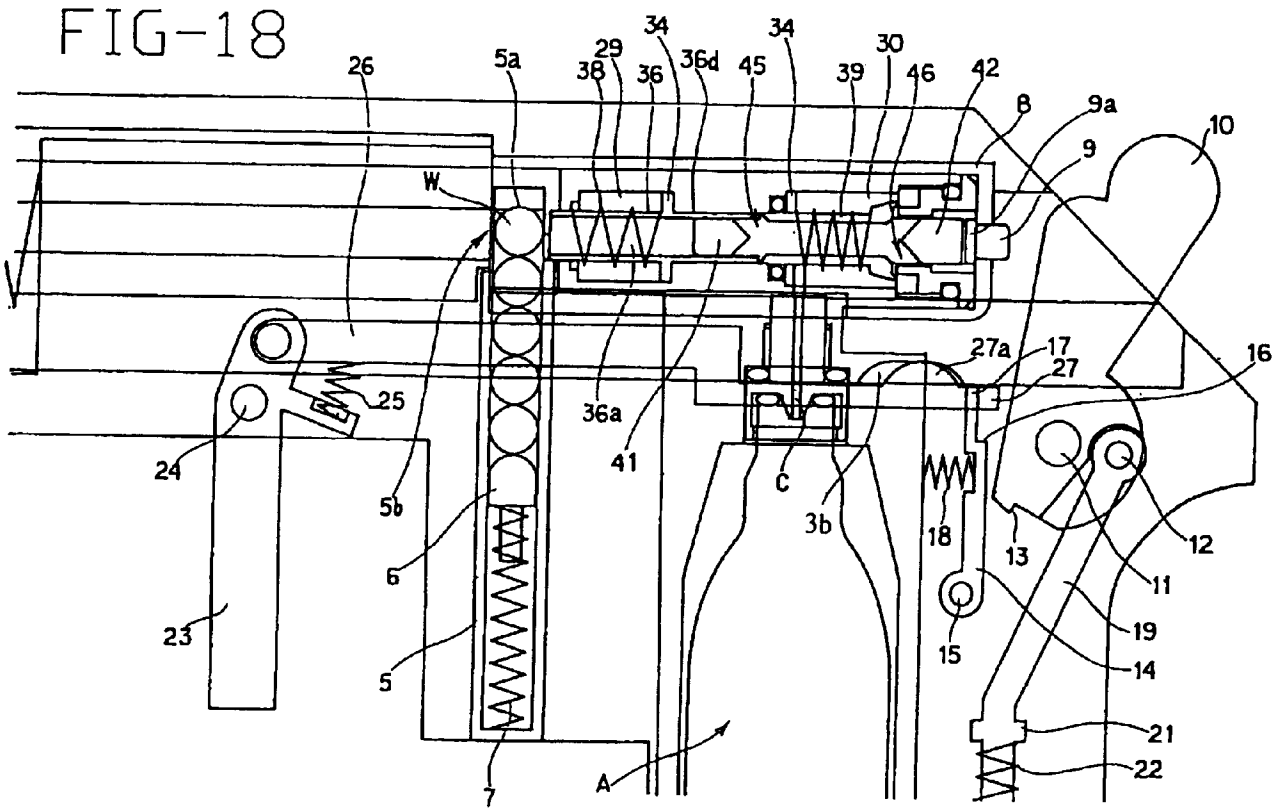
FIG. 18 is a partially enlarged sectional explanatory view of an air gun in a fourth embodiment mode.
Figure 19:
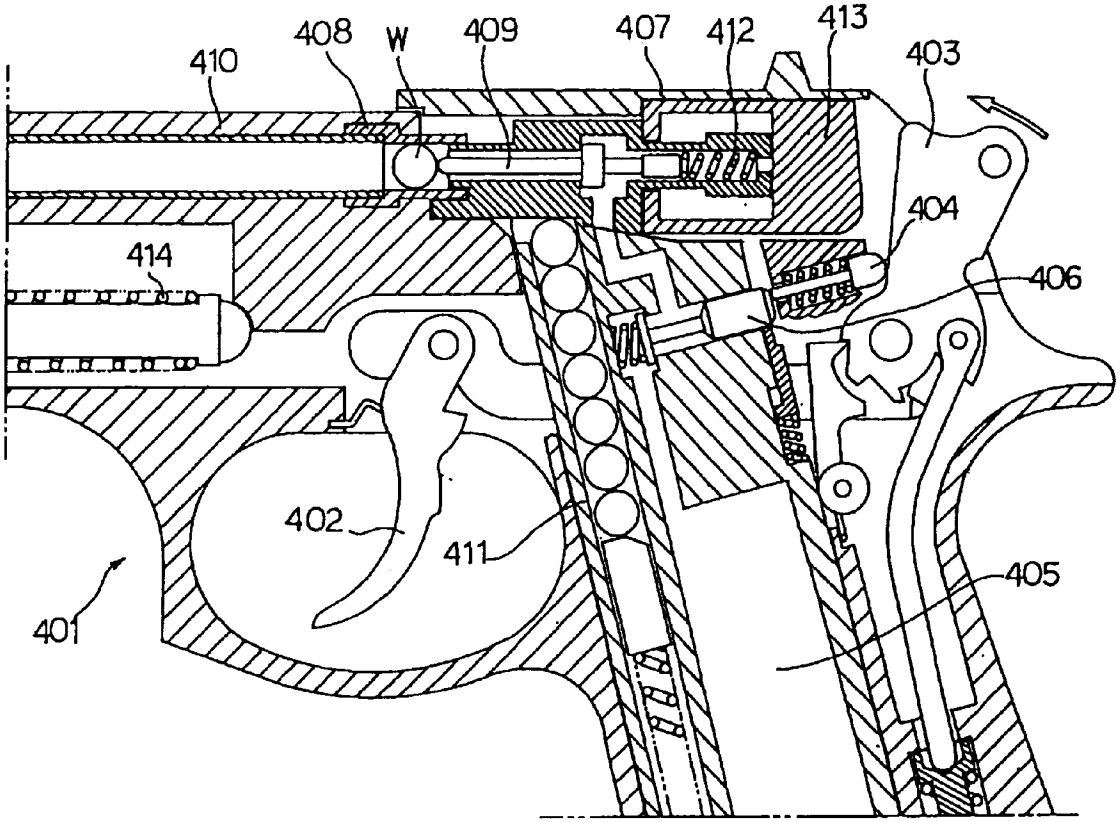
FIG. 19 is a view showing a first conventional example of the air gun.
Figure 20:
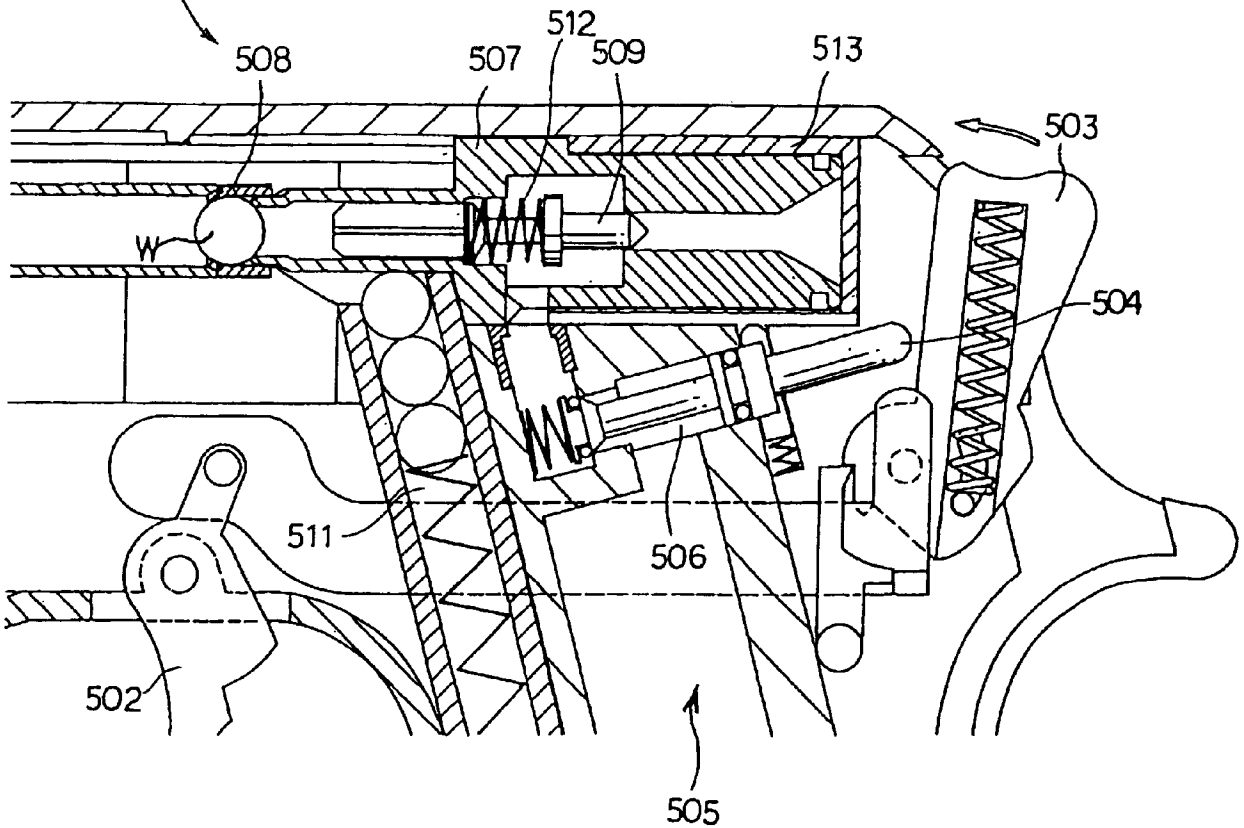
FIG. 20 is a view showing a second conventional example of the air gun.

The embodiment modes of this invention will next be described on the basis of the drawings. FIG. 1 is a sectional explanatory view showing an initial state of an air gun in an embodiment mode of this invention. FIGS. 2 to 10 are explanatory views of operations of the air gun. FIG. 11 is a partially enlarged explanatory view of FIG. 1. FIG. 12 is a partially enlarged explanatory view of FIG. 6. FIG. 13 is a partially enlarged explanatory view of FIG. 7. FIG. 14 is a partially enlarged explanatory view of FIG. 8. FIG. 15 is a partially enlarged explanatory view of FIG. 9. FIG. 16 is a partially enlarged sectional explanatory view of an air gun in a second embodiment mode. FIG. 17 is a partially enlarged sectional explanatory view of an air gun in a third embodiment mode. FIG. 18 is a partially enlarged sectional explanatory view of an air gun in a fourth embodiment mode.

Reference numeral 1 designates an air gun. The air gun 1 is an automatic type air gun for shooting a bullet W and supplying the next bullet by the pressure of a compressed carbonic acid gas. In this embodiment mode, the compressed carbonic acid gas is used, but the air gun may be also operated by another compressed gas such as a compressed nitrogen gas, a compressed air, etc. In this embodiment mode, the compressed carbonic acid gas is hereinafter called a compressed gas. A grip portion 1a is formed in a lower portion of a body of the air gun 1 on its gun rear end side. A gas bomb A for supplying the compressed gas is stored within the grip portion 1a. The gas bomb A is inserted from below the grip oortion 1a and is pressed upward by a pressing screw B so that a seal of the gas bomb A is opened at a lower end tip of a gas inlet port C described later and the compressed gas is supplied from the gas inlet port C. In this embodiment mode, the air gun is constructed such that the gas bomb A of the compressed gas is stored within the grip portion 1a. However, the air gun may be also constructed such that the compressed air is supplied to the air gun 1 by a hose, etc. from a gas bomb mounted to the exterior of the grip portion 1a or mounted by a user.

Reference numerals 2 and 2a respectively designate a barrel and a barrel fixing portion. The barrel 2 is formed in a cylindrical shape and is arranged in a rear end direction of the gun from a muzzle D. The barrel fixing portion 2a is formed in a sleeve shape capable of fixedly inserting the barrel 2 thereinto and is fixed to the body of the air gun 1 on a gun rear end side of the barrel 2. Accordingly, the barrel 2 is fixed to the body of the air gun 1 by fixing this barrel 2 to the barrel fixing portion 2a.

Reference numeral 3 designates a slide. An opening capable of inserting the barrel 2 thereinto is formed on a muzzle D side of the slide 3. The barrel 2 is inserted into the opening and the slide 3 is arranged in parallel with the barrel 2 so as to cover the barrel 2 from the muzzle D side to the gun rear end side. Further, the slide 3 can be slid along the barrel 2 in parallel with this barrel 2. The slide 3 is biased on the muzzle D side at any time by a slide spring 4 inserted onto the barrel 2 such that one end of the slide 3 is supported by the barrel fixing portion 2a and the other end of the slide 3 is supported on the muzzle side of the slide 3. An engaging projection 3a is projected downward in an upper portion of the barrel fixing portion 2a in an intermediate portion of the slide 3. A movement of the slide 3 is restrained by engaging the engaging projection 3a with the barrel fixing portion 2a such that no slide 3 is moved from its engaging position to the muzzle D side. Further, an engaging recessed portion 3b engeagable with a trigger bar described later is arranged in a lower portion of the slide 3 on its gun rear end side. The engaging recessed portion 3b is formed in a gentle angular groove shape in which the engagement of the engaging recessed portion 3b with the trigger bar is released by sliding the slide 3. The trigger bar described later is disengaged from the engaging recessed portion 3b while this trigger bar is moved downward. When the trigger bar is disengaged from the engaging recessed portion 3b, the trigger bar is moved downward. Further, a muzzle side lower portion 3c is formed in a lower portion of the slide 3 on its muzzle side. The muzzle side lower portion 3c comes in contact with the barrel fixing portion 2a when the slide 3 is moved by a predetermined amount to the gun rear end side. Accordingly, the slide 3 is moved to the most gun rearmost side in a state in which the barrel fixing portion 2a and the muzzle side lower portion 3c come in contact with each other.

Reference numeral 5 designates a bullet storage. The bullet storage 5 is located in a lower portion of the barrel 2 on its gun rear end side and can be attached and detached from the body of the air gun 1. An opening 5b is formed in an upper portion of the bullet storage 5 in the same direction as the opening of the barrel 2 at a mounting time to the body of the air gun 1. As shown in FIG. 11, a recessed portion 5a is formed in an inner surface upper portion of the opening of the bullet storage 5 so as to easily hold the supplied bullet W such that the same curved surface as a spherical surface of the bullet W is approximately formed. A magazine flow 6 and a magazine spring 7 for biasing the bullet W charged in the bullet storage 5 on an upper opening side at any time are arranged within the bullet storage 5. An upper portion of the magazine flow 6 is onstruted by a spherical surface having the same shape as the bullet W. A lower portion of the magazine flow 6 is engaged with the magazine spring 7. Since the magazine flow 6 is constructed by the spherical surface, the magazine flow 6 can be moved downward even when an empty shoot is made in a state in which no bullet storage 5 is charged with the bullet W. Accordingly, no air gun is damaged at a time of the empty shoot.

Reference numeral 8 designates a cylinder. The cylinder 8 is formed in a sleeve shape for closing the gun rear end side and is fixed to the gun rear end side of the slide 3 so as to open the muzzle D side. A notch portion 8a is formed in a side face lower portion of the cylinder 8 and is cut on the gun rear end side in comparison with the other side faces of the Cylinder 8. A hit pin 9 is formed in a columnar shape and a flange portion 9a having a diameter larger than diameters of the other portions is formed at one end of the hit pin 9. The hit pin 9 is inserted from the muzzle D side into a through hole approximately formed at the center of a gun rear end side face opposed to the opening of the cylinder 8 from an inner side of the cylinder 8. The hit pin 9 is then projected onto the gun rear end side. The flange portion 9a comes in contact with an inner surface of the cylinder 8 and is slidably arranged. Such a hit pin 9 is pressed by a hammer described later and is moved to the muzzle D side.

Reference numeral 10 designates a hammer. The hammer 10 is arranged on the gun rear end side of the cylinder 8. A hammer shaft 11 is rotatably arranged in a lower portion of the hammer 10 and is fixed to the body of the air gun 1 so that the hammer 10 is freely rotated around the hammer shaft 11 as a center. A hammer strut shaft 12 capable of rotatably attaching a hammer strut described later thereto is arranged in the hammer 10 on the gun rear end side of the hammer shaft 11. Further, a shear engaging portion 13 is arranged in the hammer 10 as a projection engagable with a shear 14 when an upper portion of the hammer 10 is rotated to the gun rear end side.

The shear 14 is adjacent to the muzzle side of the hammer 10 and a lower end of the shear 14 is rotatably attached to the body of the air gun 1 by a rotating shaft 15 so that the shear 14 is freely rotated around the rotating shaft 15 as a center. A hammer engaging portion 16 engagable with the shear engaging portion 13 of the hammer 10 is arranged in an intermediate portion of the shear 14 so as to maintain a rotating state of the hammer 10 in a state in which an upper portion of the hammer 10 is rotated to the gun rear end side. Further, an engaging projection 17 engaged with the trigger bar described later is arranged at an upper end of the shear 14. A shear spring 18 is arranged between the body of the air gun 1 and the shear 14 and biases the shear 14 onto a side of the hammer 10 at any time. Accordingly, when the shear engaging portion 13 of the hammer 10 and the hammer engaging portion 16 of the shear 14 are once engaged with each other, an engaging state of these engaging portions is maintained. This engagement is released by rotating the shear 14 to the muzzle side against biasing force of the shear spring 18 by the trigger bar described later so that the hammer 10 is rotated to the muzzle side.

Figure 3:
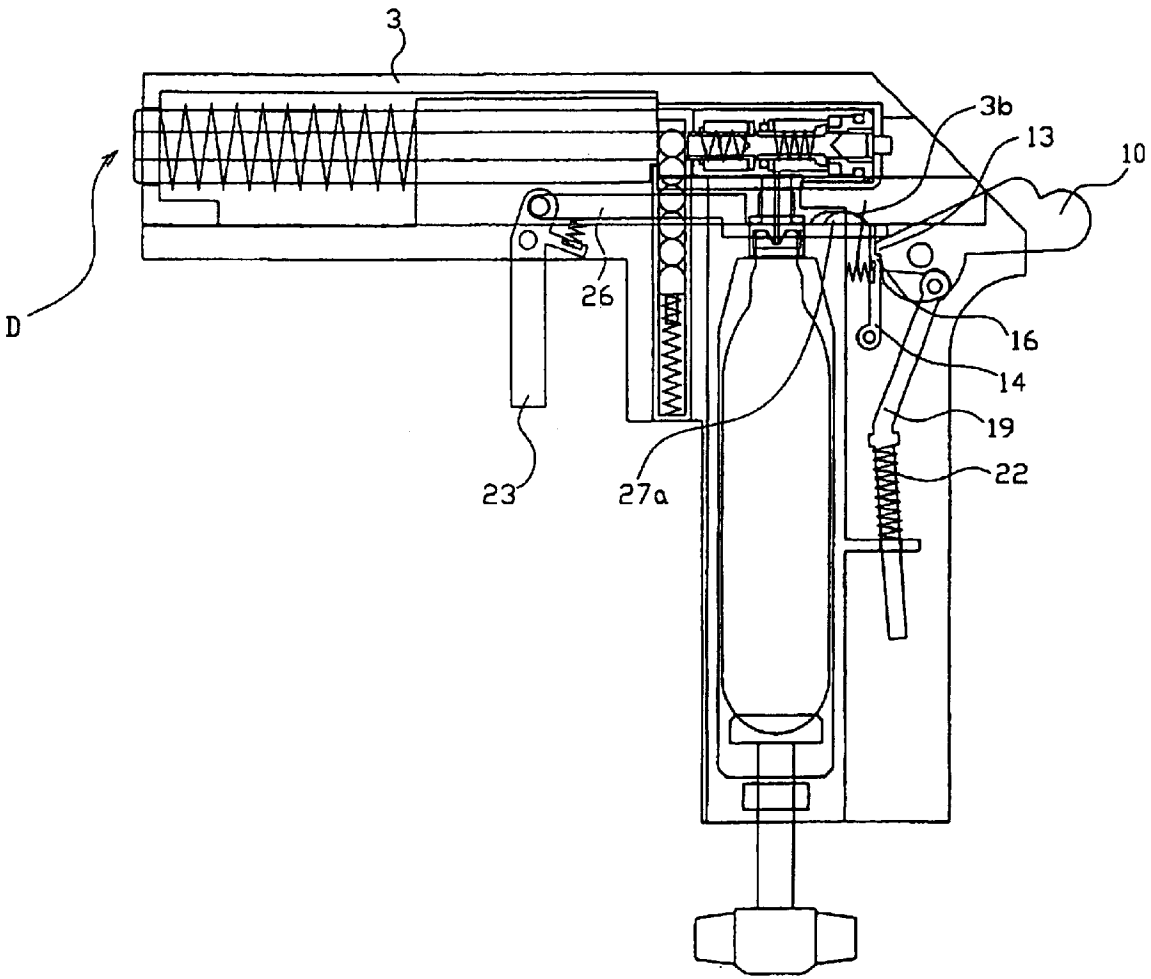
FIG. 3 is a sectional explanatory view of an operating state of the air gun.

Reference numeral 19 designates a hammer strut. One end of the hammer strut 19 is rotatably attached to the hammer strut shaft 12 arranged on the gun rear end side of the hammer shaft 11. The other end of the hammer strut 19 is inserted into a through hole formed in a hammer strut fixing portion 20 fixed to the interior of the grip portion 1a. A hammer spring 22 is arranged in the hammer strut 19 between the hammer strut fixing portion 20 and a projecting portion 21 arranged in an intermediate portion of the hammer strut 19. The hammer strut 19 is biased on the muzzle D size by the hammer spring 22 when the hammer 10 is rotated to the gun rear end side. Accordingly, the hammer 10 is located without any rotation in a state shown in FIG. 1. The hammer 10 is biased on the muzzle D side in a state in which the hammer 10 is rotated to the gun rear end side and is engaged with the shear 14 as shown in FIG. 3. Thus, the shear 14 is engaged with the hammer 10 rotated to the gun rear end side so that the hammer 10 accumulates force for rotating this hammer to the muzzle D side. When this engagement is released and the hammer 10 is rotated to the muzzle D side, the hammer 10 comes in contact with the hit pin 9 and the hit pin 9 can be slid to the muzzle side.

Reference numeral 23 designates a trigger. The trigger 23 is rotatably arranged around a trigger shaft 24 arranged in an intermediate portion of the trigger 23 and is biased by a trigger spring 25 on the muzzle side at any time.

Reference numeral 26 designates a trigger bar. The trigger bar 26 is arranged between an upper end of the trigger 23 and the engaging projection 17 of the shear 13, and is rotatably engaged with the trigger 23 at an upper end of the trigger 23. The trigger 23 is pulled by a user and is rotated around the trigger shaft 24 as a center against biasing force of the trigger spring 25 so that the trigger bar 26 is moved to the muzzle side. A shear projection 27 is arranged on the gun rear end side of the trigger bar 26 and can move the engaging projection 17 of the shear 14 to the muzzle side by moving the trigger bar 26 to the muzzle side. Since the shear projection 27 of the trigger bar 26 constructed in this way is arranged such that a side of this shear projection 27 is located in the shear 14, this side of the shear projection 27 is located in a lower portion of the slide 3. An engaging projecting portion 27a engagable with the engaging recessed portion 3b is projected upward on the side of the shear projection 27 of the trigger bar 26 in a position opposed to the engaging recessed portion 3b arranged in the lower portion of the slide 3. The engaging projecting portion 27a can be engaged with the engaging recessed portion 3b. The engagement of the engaging projecting portion 27a with the engaging recessed portion 3b is released by sliding the slide 3 to the gun rear end side so that the engaging projecting portion 27a is moved downward. However, the engaging recessed portion 3b in the lower portion of the slide 3 has a width able to be moved within the engaging recessed portion 3b even when the trigger 23 is pulled to shoot a bullet and the trigger bar 26 is moved to the gun rear end side. No engagement of the engaging recessed portion 3b and the engaging projecting portion 27a is released in the movement of the trigger bar 26 to the gun rear end side. Since the trigger bar 26 is arranged between the trigger 23 and the shear 14 in this way, the shear 14 can be rotated to the muzzle D side. The hammer 10 engaged with the shear 14 is rotated to the muzzle D side by rotating the shear 14 to the muzzle D side. When the slide 3 is slid to the gun rear end side and the engagement of the engaging projecting portion 27a and the engaging recessed portion 3b of the slide 3 is released, the trigger bar 26 is moved downward and the engagement of the shear projection 27 of the trigger bar 26 and the engaging projection 17 of the shear 14 is released. When the engagement of the engaging projecting portion 27a and the engaging recessed portion 3b is released by sliding the slide 3 to the gun rear end side and the trigger bar 26 is moved downward, no shear projection 27 of the trigger bar 26 can be engaged with the engaging projection 17 of the shear 14. Accordingly, the shear 14 is moved to a side of the hammer 10 as an initial position by the biasing force of the shear spring 18 even when the trigger 23 is pulled to shoot a bullet and the trigger bar 26 is moved to the muzzle side. Therefore, the hammer 10 and the shear 14 can be again engaged with each other.

Reference numeral 28 designates a valve body. The valve body 28 is formed in a cylindrical shape and has a hollow bullet supplying nozzle chamber 29 on the muzzle side. The valve body 28 also has a valve pin chamber 30 adjacent to the bullet supplying nozzle chamber 29 on the gun rear end side. As shown in FIG. 11, the valve body 28 is located within a hollow portion of the cylinder 8 and is fixed to the body of the air gun 1 such that the valve body 28 can be slid within the cylinder 8. Accordingly, when the slide 3 is moved to the gun rear end side, the cylinder 8 is also moved to the gun rear end side so that the valve body 28 inserted into the cylinder 8 forms a space within the cylinder 8. When the slide 3 is extremely moved in the muzzle D direction, the gun rear end side of the valve body 28 is moved from the notch portion 8a of the cylinder 3 to the muzzle D side. Thus, a gas within the space formed by the valve body 28 within the cylinder 8 can be externally discharged from the notch portion 8a. In this embodiment mode, a moving distance of the valve body 28 in the space formed by the valve body 28 and an inner surface of the cylinder 8 on its gun rear end side is set to about 31 mm in a state (a state shown in FIG. 9) in which the muzzle side lower portion 3c of the slide 3 comes in contact with the barrel fixing portion 2a and the slide 3 is moved to the gun rearmost end side. In contrast to this, the moving distance of an end portion of the valve body 28 on its gun rear end side located in the notch portion 8a is set to about 11 mm. Through holes having diameters smaller than those of the bullet supplying nozzle chamber 29 and the valve pin chamber 30 is formed from the gun rear end side of the valve body 28 to the muzzle side. With respect to each of the formed through holes, a through hole formed on the muzzle side of the bullet supplying nozzle chamber 29 is set to a muzzle side through hole 31, and a through hole formed on the muzzle side of the valve pin chamber 30 is set to an intermediate portion through hole 32, and a through hole formed on the gun rear end side of the valve pin chamber 30 is set to a rear end side through hole 33. The intermediate portion through hole 32 is formed through a ring packing 35 having a donut shape between an intermediate wall of the valve body 28 and a packing pressing washer 34 arranged on a valve pin chamber side of the intermediate wall of the valve body 28. Further, a diameter of the rear end side through hole 33 on its gun rear end side is set to be larger than that of the hit pin 9 of the cylinder 8. When the valve body 28 is located on the gun rearmost end side within the cylinder 8, a gun rear end side face of the valve body 28 can come in contact with the inner surface of the cylinder 8 on its gun rear end side. Further, a gas inlet port C is opened in a side face lower portion of the valve pin chamber 30 on its side of the intermediate portion through hole 32. This gas inlet port C is formed as a passage of the compressed gas supplied from the gas bomb A stored within the grip portion 1a to the valve body 28.

An upper end of the gas inlet port C is opened to the valve pin chamber 30. A lower end of the gas inlet port C is located at an upper end of the, gas bomb A fixedly inserted into the grip portion 1a. An unillustrated seal opening pin for opening an unillustrated seal opening portion formed in an upper portion of the gas bomb A is arranged at a lower end of the gas inlet port C. The unillustrated seal opening pin opens a seal of the gas bomb A by fixedly inserting the gas bomb A so that the compressed gas is supplied to the valve pin chamber 30 via the gas inlet port C. Thus, a pressure of the compressed gas can be applied to the valve pin chamber 30 at any time.

Reference numeral 36 designates a bullet supplying nozzle. The bullet supplying nozzle 36 is formed in a cylindrical shape and is arranged within the bullet supplying nozzle chamber 29 of the valve body 28. The bullet supplying nozzle 36 is arranged such that one end of the bullet supplying nozzle 36 is projected from the muzzle side through hole 31 of the bullet supplying nozzle chamber 29 to the muzzle side. A muzzle side end portion of the bullet supplying nozzle 36 is located on the gun rear end side of an upper opening of the bullet storage 5 located on the gun rear end side of the barrel 2. Further, a spring presser 37 is arranged on the gun rear end side of the bullet supplying nozzle 36 and approximately has the same diameter as an inside diameter of the bullet supplying nozzle chamber 29. The bullet supplying nozzle 36 is biased on the gun rear end side at any time by a return spring 38 arranged between the spring presser 37 and a muzzle side inner surface of the bullet supplying nozzle chamber 29 in an outer circumference of the bullet supplying nozzle 36. The spring presser 37 is pressed against the inner surface of the bullet supplying nozzle chamber 29 on, its gun rear end side. Further, a through hole 36a as a cylindrical hollow portion of the bullet supplying nozzle 36 is set to have a diameter smaller than that of the intermediate portion through hole 32 of the valve body 28. An end tip of such a bullet supplying nozzle 36 on its muzzle D side is projected from the valve body 28 to the muzzle D side by moving the bullet supplying nozzle chamber 29 in the muzzle D direction, and presses against a bullet W located within the opening 5b of the bullet storage 5 located on the muzzle D side of the valve body 28. Thus, the bullet W is moved into the barrel 2 opened to the muzzle D side of the gun opening 5b. In this embodiment mode, the spring presser 37 is constructed such that this spring presser 37 approximately has the same diameter as the inside diameter of the bullet supplying nozzle chamber 29. However, the spring presser 37 may be set to have a diameter smaller than the inside diameter of the bullet supplying nozzle chamber 29. If the return spring 38 is engagable, the present invention can be embodied even when no spring presser is particularly arranged.

Reference numeral 39 designates a valve pin. An intermediate portion of the valve pin 39 is constructed by a pin body 40 formed in a cylindrical shape. A nozzle inserting portion 41 is continuously connected onto the muzzle D side of the pin body 40. A pressing portion 42 is continuously connected onto the gun rear end side of the pin body 40. An end tip of the pin body 40 on its muzzle D side is inserted into the intermediate portion through hole 32. The pin body 40 can be slid while an airtight state is held between an outer circumference of the pin body 40 and the packing 35. The continuously connected nozzle inserting portion 41 is arranged in a position inserted into the cylindrical hollow portion of the bullet supplying nozzle 36 located in the adjacent bullet supplying nozzle chamber 29. The pin body 40 is arranged such that the continuously connected pressing portion 42 is inserted into the rear end side through hole 33 and an end portion tip of the pressing portion 42 on its gun rear end side is located in a position adjacent to the hit pin 9. The pressing portion 42 can be slid between the pressing portion 42 and the rear end side through hole 33 in a permeable state of the compressed gas. A valve pin flange portion 43 is arranged on the gun rear end side of the pin body 40. The valve pin flange portion 43 comes in contact with a side face of the valve pin chamber 30 on its gun rear end side and is set to have a diameter smaller than an inside diameter of the valve pin chamber 30. The valve pin flange portion 43 and the side face of the valve pin chamber 30 on its gun rear end side come in contact with each other in an airtight state. In this embodiment mode, a flat packing formed in a ring shape is arranged on the side face of the valve pin chamber 30 on its gun rear end side coming in contact with the valve pin flange portion 43. Reference numeral 44 designates a valve pin return spring. The valve pin return spring 44 is formed in a coil shape and is inserted to the pin body 40 and is arranged between the intermediate portion through hole 32 and the valve pin flange portion 43 of the pin body 40 so that the pin body is biased on the gun rear end side at any time. The gun rear end side face of the valve pin chamber 30 and the valve pin flange portion 43 are held in the airtight state by biasing force of the valve pin return spring 44. A nozzle chamber side opening 45 and a valve pin chamber side opening 46 are arranged in a hollow portion of the pin body 40 arranged as mentioned above. The nozzle chamber side opening 45 is opened to a side face of the pin body 40 on the gun rear end side of the nozzle inserting portion 41. The valve pin chamber side opening 46 is opened to the side face of the pin body 40 on the muzzle side of the pressing portion 42. The nozzle chamber side opening 45 and the valve pin chamber side opening 46 enable passage of the compressed gas.

When the valve pin 39 is arranged in the valve pin chamber 30 of the valve body 28 in this way and is pressed by the hit pin 9 pressed by the hammer 10 and moved to the muzzle D side and is moved to the muzzle D side, a clearance is formed between the valve pin flange portion 43 of the pin body 40 and the side face of the valve pin chamber 30 on its gun rear end side. The compressed gas supplied to the valve pin chamber 30 at any time is supplied from the clearance between the side face of the valve pin chamber 30 on its gun rear end side and the valve pin flange portion 43 to a clearance formed between the spring presser 37 of the bullet supplying nozzle 36 and an inner surface of the bullet supplying nozzle chamber 29 on its gun rear end side via the valve pin side opening 46 of the pin body 40, the interior of the pin body and the nozzle chamber side opening 45. Thus, the bullet supplying nozzle 36 is slid by a gas pressure to the muzzle D side against the biasing force. Then, the compressed gas is supplied from a clearance formed between the nozzle inserting portion 41 and an opening of the bullet supplying nozzle 36 on its side of the spring presser 37 to an opening of the bullet supplying nozzle 36 on its muzzle D side. Thus, a muzzle D side end portion of the bullet supplying nozzle 36 enables shooting of the bullet W moved from the opening 5b of the bullet storage 5.

Next, an operation of the air gun constructed in the above embodiment mode will be explained.

A state illustrated in FIG. 1 shows a basic position provided before the air gun 1 is operated. In the basic position of the air gun 1, no hammer 10 is rotated to the gun rear end side and presses against the hit pin 9. Further, the gas bomb A is already stored within the grip portion 1a and a seal of the gas bomb A is opened by the gas inlet port C. Accordingly, a compressed gas is supplied from the gas bomb A into the valve pin chamber 30 of the valve body 28 via the gas inlet port C. Further, the bullet storage 5 is already charged with a bullet W and the bullet W is biased upward by the magazine spring 7 and the magazine flow 6. The first bullet W is located in the recessed portion 5a of the opening 5b.

The interior of the valve pin chamber 30 of the valve body 28 is already filled with the compressed gas. Accordingly, a pressure of the compressed gas is uniformly applied to an inner wall of the valve pin chamber 30 and an outside surface of the pin body 40 exposed into the valve pin chamber 30. No force of the compressed gas applied to the pin body 40 is given in a direction for moving the valve pin 39 to the muzzle D side. Further, the valve pin 39 is biased to the gun rear end side by the valve pin spring 44 so that the valve pin flange portion 43 comes in contact with a gun rear end side inner surface of the valve pin chamber 30 in an airtight state. Accordingly, the valve pin 39 maintains a state in which the valve pin flange portion 43 comes in contact with the gun rear end inner surface of the valve pin chamber 30 in the airtight state. Therefore, no compressed gas is externally moved from the valve pin chamber 30.

Figure 2:
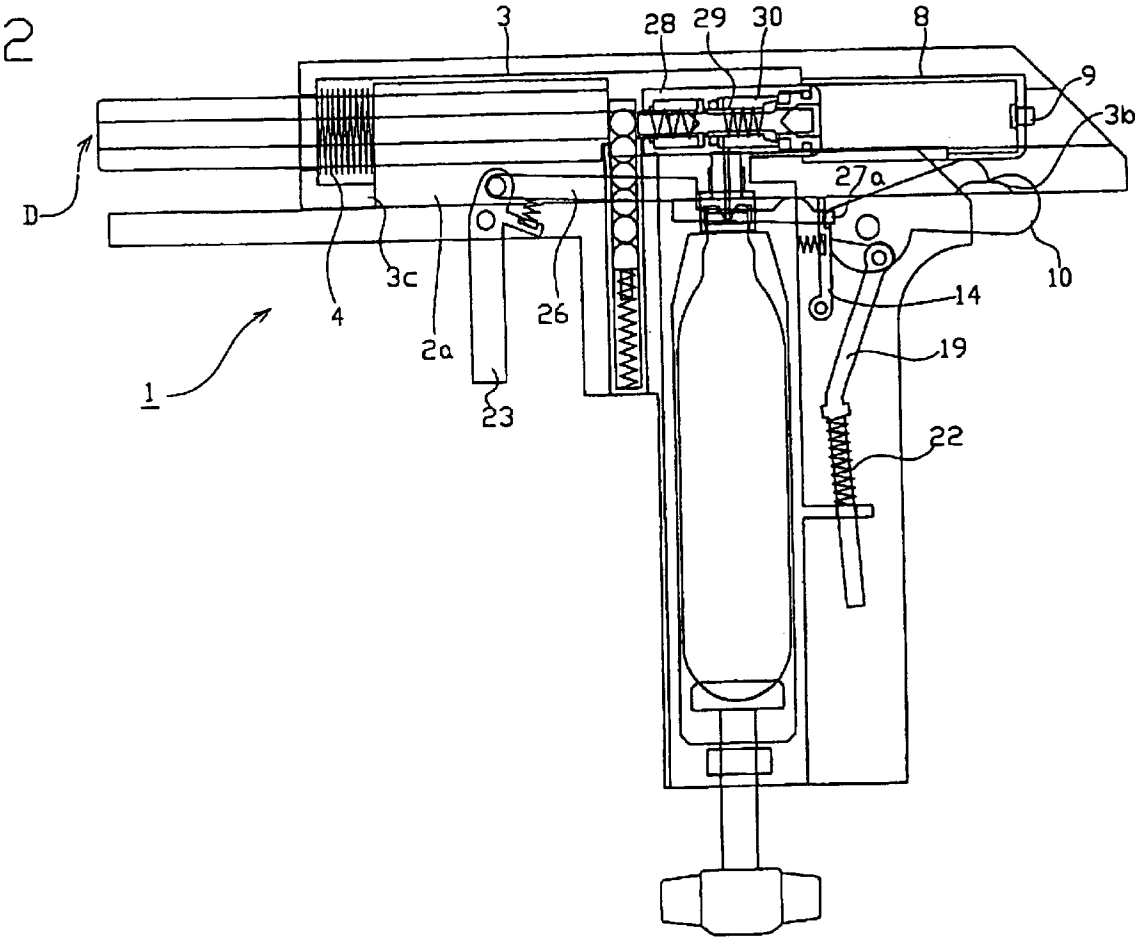
FIG. 2 is a sectional explanatory view of an operating state of the air gun.

When the air gun 1 is used, the slide 3 is moved to the gun rear end side against biasing force of the slide spring 4 as shown in FIG. 2. Thus, the cylinder 8 fixed to the slide 3 is also moved to the gun rear end side. At this time, the hit pin 9 is also moved to the gun rear end side together with the slide 3, but no valve body 28 is moved. No valve pin 39 is also moved. Accordingly, the compressed gas is in a state in which the compressed gas fills the interior of the valve pin chamber 30 as it is. When the cylinder 8 is moved to the gun rear end side, the cylinder 8 presses against the hammer 10 in a lower portion of the cylinder 8 on its gun rear end side in a moving process of the cylinder 8. Thus, the cylinder 8 rorates the hammer 10 to the gun rear end side against biasing force of the hammer strut 19 and the hammer spring 22. At this time, the engaging projecting portion 27a is disengaged from the engaging recessed portion 3b of the slide 3 and the trigger bar 26 is moved downward on a lower face of the slide 3 and the engagement of the trigger bar 26 with the shear 14 is released. Accordingly, the shear 14 is located in the same initial position as FIG. 1 on a side of the hammer 10 even when the trigger 23 is pulled or not pulled. When the slide 3 is moved to the gun rearmost end in a short time, the muzzle side lower portion 3c of the slide 3 comes in contact with a muzzle side lower portion of the barrel fixing portion 2a so that no muzzle side lower portion 3c can be moved to the gun rear end side. Thus, the movement of the slide 3 is terminated and the slide 3 is returned to the same position as FIG. 1.

FIG. 3 shows a state in which the slide 3 is returned in this way. At this time, the shear engaging portion 13 of the hammer 10 is engaged with the hammer engaging portion 16 of the shear 14 and the hammer 10 is held in a state in which the hammer 10 is rotated to the gun rear end side against the biasing force provided by the hammer strut 19 and the hammer spring 22. The cylinder 8 is also returned to an initial state position shown in FIG. 1. Since the cylinder 8 is returned to the initial position, the engaging projecting portion 27a is engaged with the engaging recessed portion 3b of the slide 3 so that the trigger bar 26 is also moved upward.

Figure 4:
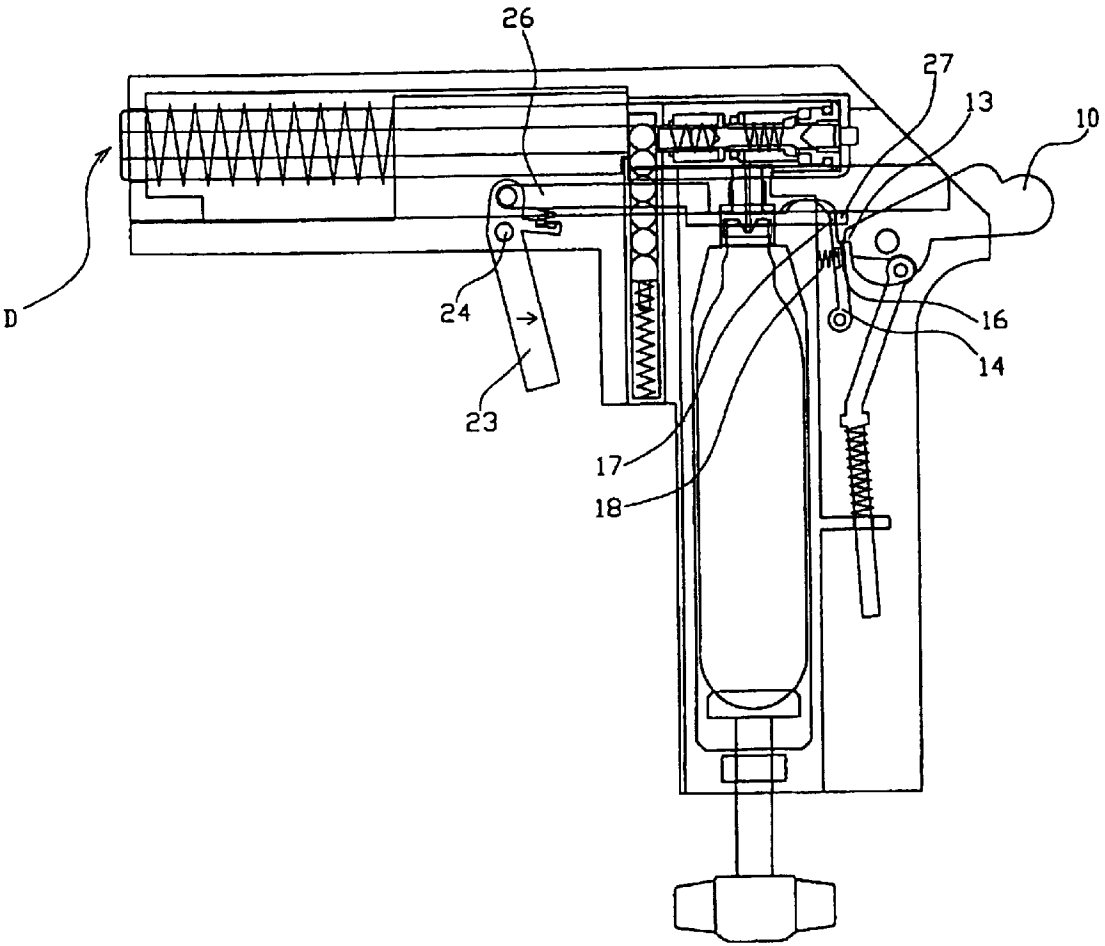
FIG. 4 is a sectional explanatory view of an operating state of the air gun.
Figure 5:
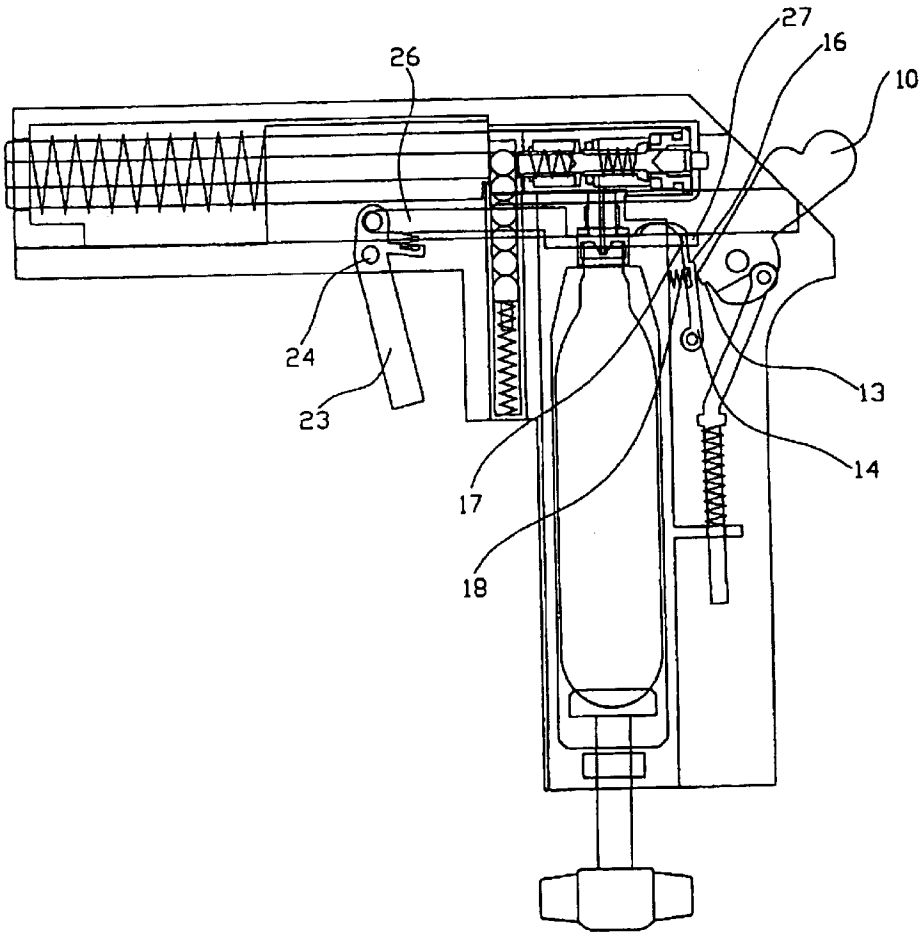
FIG. 5 is a sectional explanatory view of an operating state of the air gun.
Figure 6:
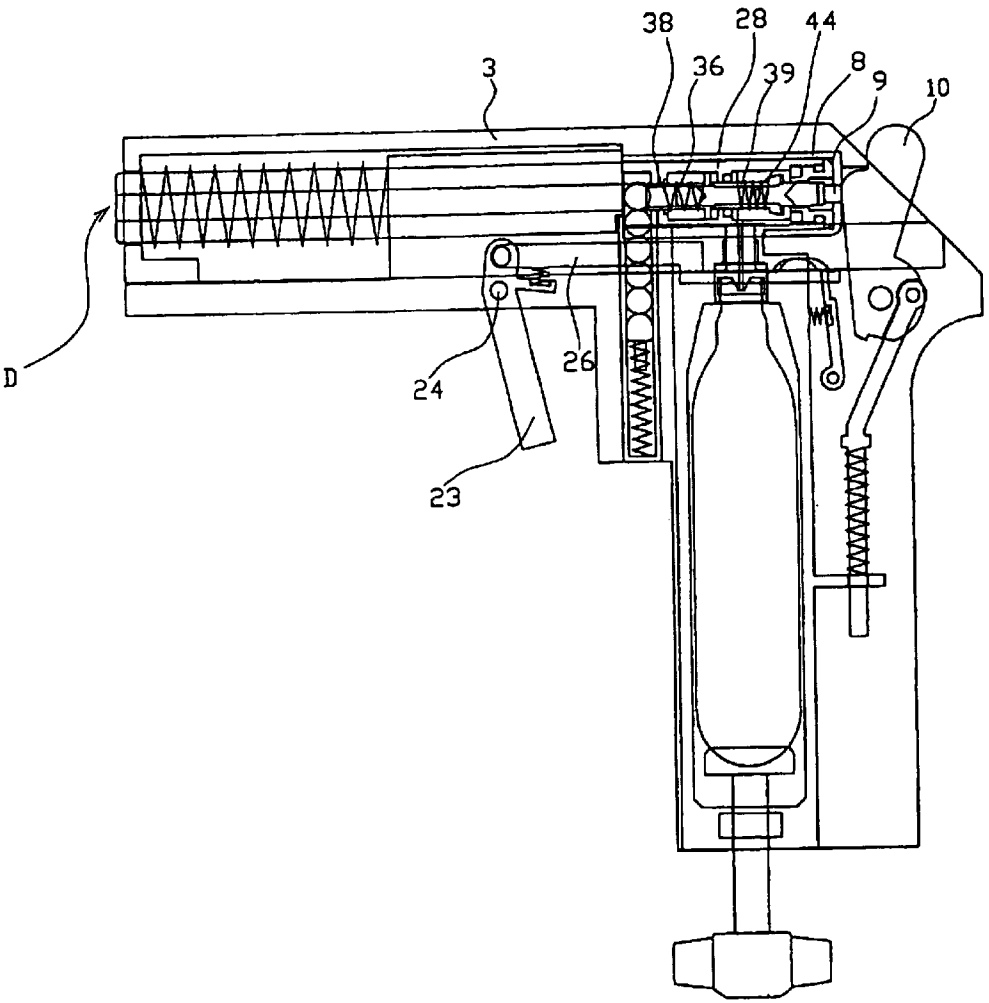
FIG. 6 is a sectional explanatory view of an operating state of the air gun.

The trigger 23 is next rotated to the gun rear end side to shoot a bullet as shown by an arrow in FIG. 4. The trigger bar 26 rotatably engaged with an upper portion of the trigger 23 is also moved in the muzzle D direction in accordance with the rotation of the trigger 23. In the state of FIG. 4, the shear engaging portion 27 of the trigger bar 26 is engaged with the engaging projection 17 of the shear 14 so that the shear engaging portion 27 of the trigger bar 26 rotates the engaging projection 17 of the shear 14 in the muzzle D direction and the shear 14 is rotated to the muzzle D side against biasing force of the shear spring 18. Since the shear 14 is rotated, the engagement of the hammer engaging portion 16 of the shear 14 and the shear engaging portion 13 of the hammer 10 is released as shown in FIG. 5 so that the hammer 10 is rotated in the muzzle D direction by the biasing force. As shown in FIGS. 6 and 12, the hammer 10 presses against the hit pin 9 in a short time. Since the hit pin 9 is pressed, the valve pin 39 located on the muzzle D side of the hit pin 9 is pressed by the hit pin 9 and is moved to the muzzle D side against biasing force of the valve pin return spring 44. Further, the bullet supplying nozzle 36 into which the nozzle inserting portion 41 continuously fixed to the muzzle side of the valve pin 39 is inserted, is also pressed by a muzzle side end portion of the pin body 40 and is moved to the muzzle D side against biasing force of the return spring 38. When the bullet supplying nozzle 36 is moved to the muzzle D side, the spring presser 37 of the bullet supplying nozzle 36 is also slid and moved to the muzzle D side while an airtight state of the spring presser 37 and an inner surface of the bullet supplying nozzle chamber 29 is held. As a result, a space can be formed between the spring presser 37 and the gun rear end side of the bullet supplying nozzle chamber 29. When the valve pin 39 is simultaneously moved to the muzzle D side, the valve pin flange portion 43 of the valve pin 39 is also moved to the muzzle D side. Thus, the contact of the valve pin flange portion 43 and a gun rear end side inner wall of the valve pin chamber 30 in an airtight state is released. Accordingly, the compressed gas supplied until the valve pin chamber 30 is supplied from a valve pin chamber side opening 46 formed in the pin body 40 of the valve pin 39 into the pin body 40 via a clearance formed between the gun rear end side inner wall of the valve pin chamber 30 and the valve pin flange portion 43. The compressed gas supplied into the pin body 40 is further flowed out to a side of the hit pin 9 from the clearance between the rear end side through hole 33 of the valve body 28 and the pressing portion 42 continuously fixed to the gun rear end side of the pin body 40. The compressed gas is simultaneously supplied to the muzzle D side and is flowed from the nozzle chamber side opening 45 of the pin body 40 into a space between the interior of the bullet supplying nozzle chamber 29 and the spring presser 37 formed by moving the spring presser 37 arranged in the bullet supplying nozzle 36 in the muzzle D direction.

Figure 7:
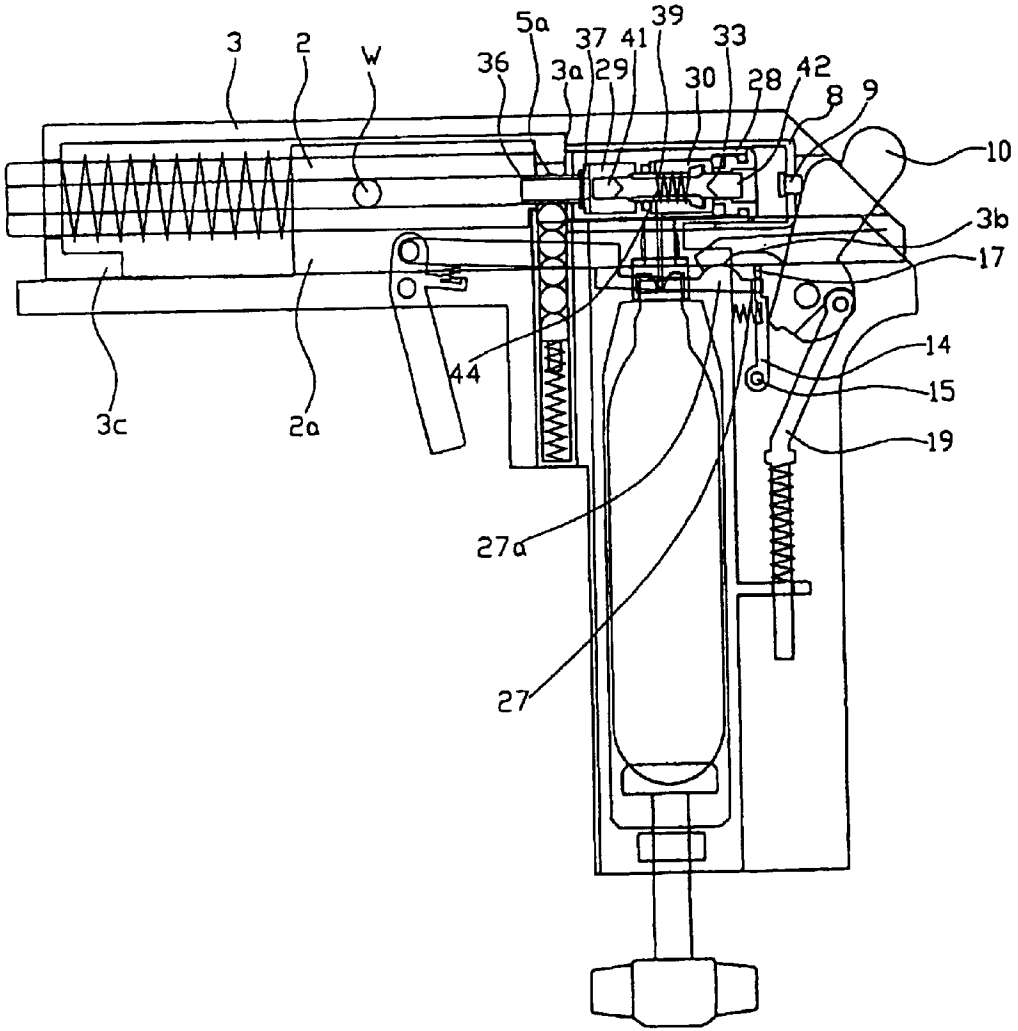
FIG. 7 is a sectional explanatory view of an operating state of the air gun.

The compressed gas is further flowed into this space and the spring presser 37 of the bullet supplying nozzle 36 is further slid to the muzzle D side by the pressure of the compressed gas. The bullet supplying nozzle 36 is continuously moved to the muzzle D side and a clearance is formed in a short time between an opening of the bullet supplying nozzle 36 on its side of the spring presser 37 and the nozzle inserting portion 41 continuously fixed to the muzzle side of the valve pin 39. The compressed gas is forcibly supplied from a sleeve-shaped opening of the bullet supplying nozzle 36 to the muzzle D side and moves the bullet W to the muzzle D side. Further, an inner surface of the cylinder 8 on its gun rear end side is simultaneously pressed by the pressure of the compressed gas flowed out to the gun rear end side from the clearance between the pressing portion 42 and the rear end through hole 33. A space is formed on the gun rear end side of the interior of the cylinder 8 between this gun rear end side and a gun rear end side of the valve body 28. This formed space is enlarged by the pressure of the flowed compressed gas. This state is shown in FIGS. 7 and 13. At this time, since the valve body 28 is fixed to the body of the air gun 1, the cylinder 8 is moved to the gun rear end side and the slide 3 fixed to the cylinder 8 is also moved to the gun rear end side. In the state shown in FIGS. 7 and 13, a lower portion of the cylinder 8 on its gun rear end side already begins to rotate the hammer 10 to the gun rear end side. Since the slide 3 is slid to the gun rear end side, the engagement of the engaging projecting portion 27a of the trigger bar 26 and the engaging recessed portion 3b in a lower portion of the slides 3 is released so that the engaging projecting portion 27a comes in contact with a lower end of the slide 3 and is moved downward and the engagement of the trigger bar 26 and the shear 14 is released. Further, since the cylinder 8 is moved in the gun rear end direction, the hit pin 9 releases pressing of the pressing portion 42 of the valve pin 39 and the valve pin 39 is pushed back to the gun rear end side by biasing force of the valve pin return spring 44 in a short time.

Figure 8:
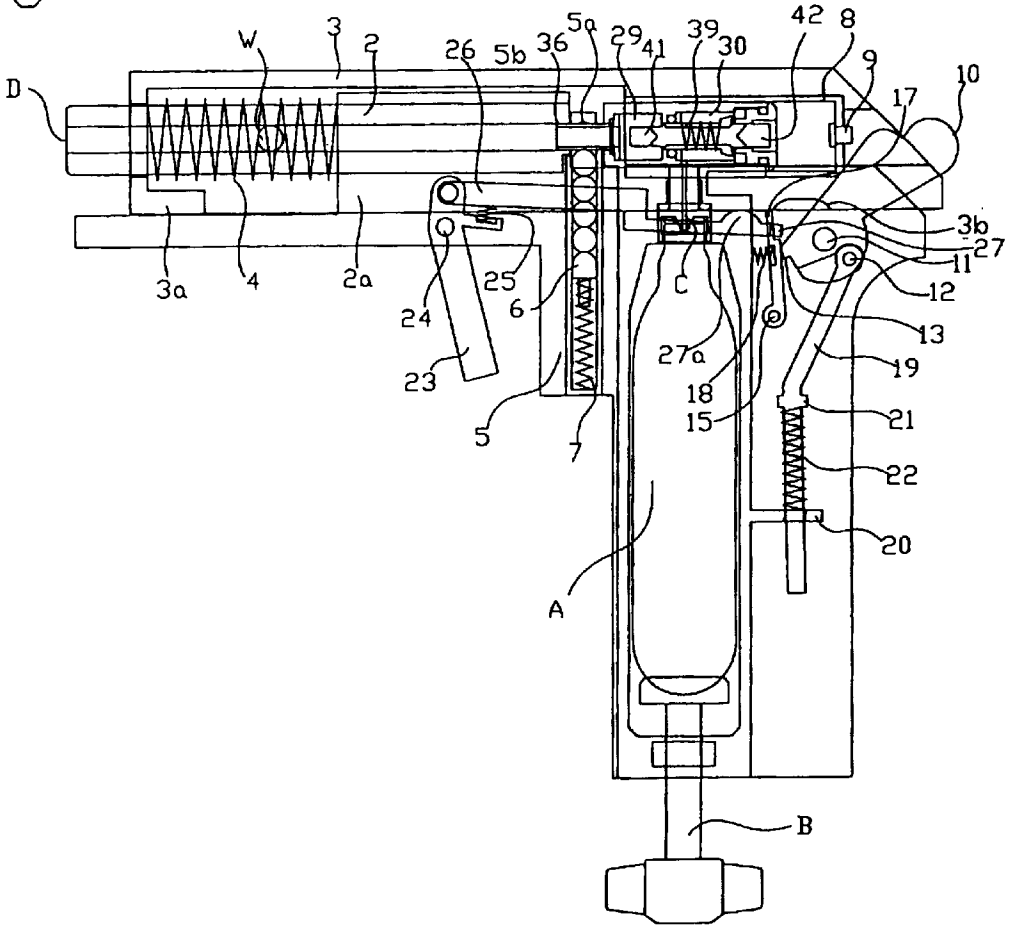
FIG. 8 is a sectional explanatory view of an operating state of the air gun.

FIGS. 8 and 14 show a state in which the valve pin 39 is returned to the gun rear end side. The valve pin flange portion 43 of the valve pin 39 and a gun rear end side inner surface of the valve pin chamber 30 are set to an airtight state and the supply of the compressed gas into the valve pin 39 is terminated. The supply of the compressed gas for shooting the bullet W to the muzzle D is stopped, but the already supplied compressed gas is continuously expanding so that the bullet W is further forcibly and continuously moved to the muzzle D side by expanding force of the compressed gas and inertial force of this bullet and is shot from the muzzle D in a short time. In contrast to this, the already supplied compressed gas is also continuously expanding within the space on the gun rear end side within the cylinder 8 in which the supply of the compressed gas is simultaneously stopped. Accordingly, the cylinder 8 is further continuously moved to the gun rear end side by the expanding force of the compressed gas and inertial force of the cylinder 8. When the slide 3 is moved to the gun rearmost end side and rotates the hammer 10 to the gun rear end side in a short time, the hammer 10 is again engaged with the shear 14. This state is shown in FIG. 9.

Figure 9:
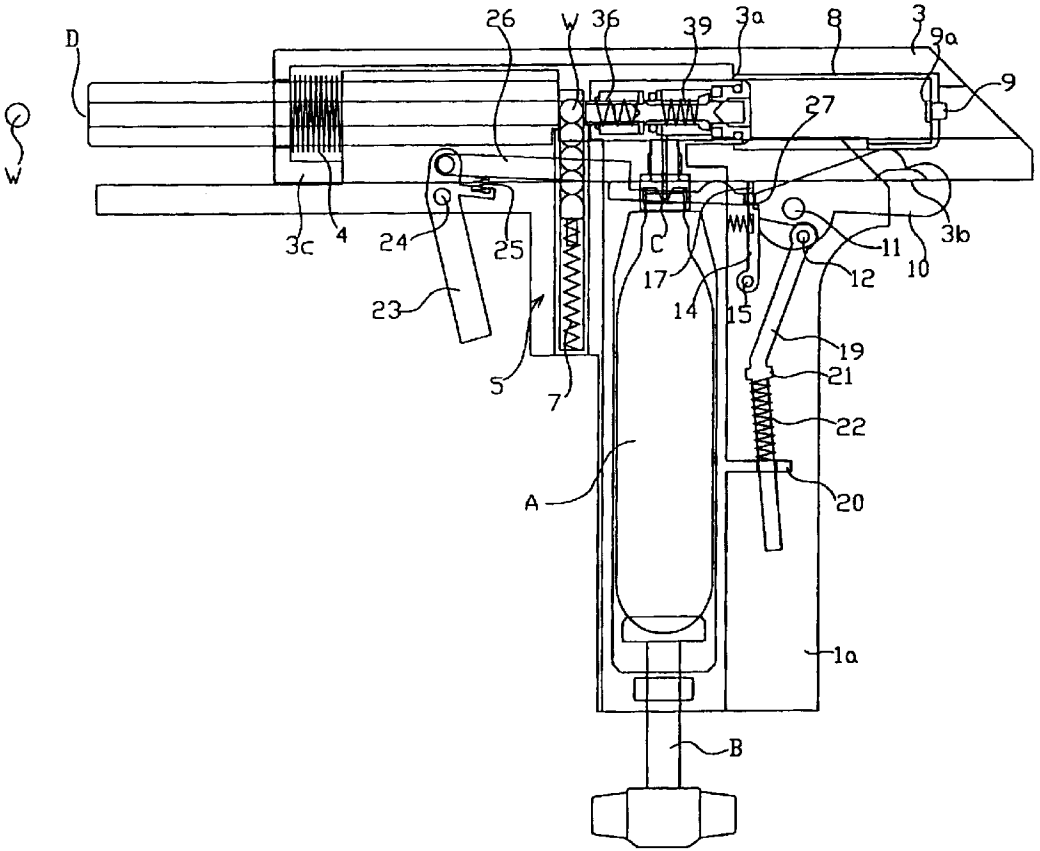
FIG. 9 is a sectional explanatory view of an operating state of the air gun.

In the state shown in FIG. 9, the bullet W is already shot from the muzzle D and the expansion of the compressed gas supplied to the muzzle D side of the valve pin 39 is terminated and this compressed gas is discharged from the muzzle. The bullet supplying nozzle 36 is again returned to the gun rear end side by the biasing force of the return spring 38 and attains a state (an initial state) in which the nozzle inserting portion 41 is inserted into the opening on a sides of the spring presser 37. In contrast to this, the cylinder 8 also attains a state in which the muzzle side lower portion 3c comes in contact with the barrel fixing portion 2a and is moved to the gun rearmost end side. Accordingly, the gas is being discharged from a clearance formed between the gun rear end side lower portion of the valise body 28 and the notch portion 8a of the cylinder 8. The shear engaging portion 13 of the hammer 10 and the hammer engaging portion 16 of the shear 14 are again engaged with each other. The trigger bar 26 is moved downward since the engagement of the engaging projecting portion 27a and the engaging recessed portion 3b of the slide 3 is released and the trigger bar 26 comes in contact with a lower portion of the slide 3. Accordingly, the engaging projection 17 of the shear 14 and the shear projection 27a of the trigger bar 26 are not engaged with each other. Since the bullet supplying nozzle 36 is returned to the gun rear end side, the next bullet W is supplied to the opening 5b of the bullet storage 5.

Since the slide 3 has moved to the gun rearmost end side, the slide 3 is again returned to the muzzle D side by the biasing force of the slide spring 4. FIG. 10 shows a state in which the slide 3 is returned to the muzzle D side. The number of bullets W charged in the bullet storage 5 is naturally reduced by one. The trigger 23 is pulled and a bullet is shot from the state shown in FIG. 4 and the operating slide 3 is moved to the gun rear end side and is again returned to the state of FIG. 10. A series of these operations from the stats of FIG. 4 to the state of FIG. 10 is instantaneously performed. In the state of FIG. 10, the trigger 23 is yet pulled onto the gun rear end side as it is. Accordingly, the engaging projecting portion 27a of the trigger bar 26 has already reached a lower portion of the engaging recessed portion 3b of the slide 3, but the shear engaging portion 27 of the trigger bar 26 is located in a lower portion of the engaging projection 17 of the shear 14 so that no shear engaging portion 27 can be moved upward.

When a user separates a user's finger from the trigger 23 in this state and the movement of the trigger 23 to the gun rear end side is stopped, the trigger 23 is returned to the muzzle D side by biasing force of the trigger spring 25. The trigger bar 26 moved in association with the trigger 23 is moved to the gun rear end side, and the shear projection 27 is moved from the engaging projection 17 of the shear 14 to the gun rear end side. Accordingly, the trigger bar 26 can be moved upward so that the trigger bar 26 is moved upward by the biasing force of the trigger spring 25 and the engaging projecting portion 27a is engaged with the engaging recessed portion 3b of the slide 3. This state is shown in FIG. 3. The number of bullets W charged in the bullet storage 5 is naturally reduced by one, but a state for shooting the next bullet W is prepared and the operations shown in FIGS. 4 to 10 are repeated bib pulling the trigger 26 so that the next bullet W is shot and preparations for shooting of the further next bullet are made.

Thus, the hammer 10 is engaged with the shear 14 in a state in which the hammer 10 is rotated to the gun rear end side by pulling the slide 3 to the gun rear end side from the state of FIG. 1. Thereafter, bullets W can be sequentially shot by pulling the trigger 26.

In this embodiment mode, as shown in FIG. 11, etc., the nozzle inserting portion 41 of the valve pin 39 is inserted from the gun rear end side of the bullet supplying nozzle 36 into the cylindrical hollow portion. However, when the bullet supplying nozzle 36 and the valve pin 39 are constructed as shown in a second embodiment mode in FIG. 16, these nozzle and valve pin can be used as in the bullet supplying nozzle 36 and the valve pin 39 shown in the first embodiment mode. The other constructions are similar to those in the first embodiment mode.

Namely, as shown in FIG. 16, the bullet supplying nozzle 36 is formed in a cylindrical shape and is arranged within the bullet supplying nozzle chamber 29 of the valve body 28. One end of the bullet supplying nozzle 36 is projected from a muzzle side through hole 31 of the bullet supplying nozzle chamber 29 to the muzzle D side and is slidably arranged within the muzzle side through hole 31. A muzzle D side end portion of the bullet supplying nozzle 36 is located on the gun rear end side of the opening 5b formed in the bullet storage 5. Further, a spring presser 37 approximately having the same diameter as an inside diameter of the bullet supplying nozzle chamber 29 is arranged on the gun rear end side of the bullet supplying nozzle 36. The bullet supplying nozzle 36 is biased on the gun rear end side at any time by a return spring 38 arranged between the spring presser 37 and a muzzle D side inner surface of the bullet supplying nozzle chamber 29 is an outer circumference of the bullet supplying nozzle 36. The spring presser 37 is pressed against the gun rear end side inner surface of the bullet supplying nozzle chamber 29. Further, an inserting portion 36b is arranged on the gun rear end side of the bullet supplying nozzle 36 such that the inserting portion 36b can be inserted from the muzzle D side into a through hole of the pin body 40. The bullet supplying nozzle 36 is arranged in a state in which the inserting portion 36b is inserted from the muzzle D side into the through hole of the pin body 40 arranged within the valve pin chamber 30. Accordingly, a cylindrical hollow portion of the bullet supplying nozzle 36 on its side of the spring presser 37 is opened around the inserting portion 36b on a gun rear end side face of the bullet supplying nozzle 36. The cylindrical hollow portion is opened in a Y-character shape in cross section in this embodiment mode. A muzzle D side end tip of the bullet supplying nozzle 36 arranged in this way is projected from the valve body 28 to the muzzle D side by moving the bullet supplying nozzle chamber 29 in the muzzle D direction. The bullet supplying nozzle 36 then presses against the bullet W within the opening 5b of the bullet storage 5 located on the muzzle D side of the valve body 28 so that the bullet W is moved into the barrel 2 opened to the muzzle D side of the opening 5b.

An intermediate portion of the valve pin 39 is constructed by the pin body 40 formed in a cylindrical shape and no nozzle inserting portion 41 is arranged in this embodiment mode. A pressing portion 41 is continuously connected to the gun rear end side of the pin body 40. The pin body 40 can be slid while a muzzle D side end tip of the pin body 40 is inserted into a intermediate portion through hole 32 and an airtight state is held between an outer circumference of the pin body 40 and a packing 35. The pin body 40 is arranged in a state in which the inserting portion 36b of the bullet supplying nozzle 36 located in the adjacent bullet supplying nozzle chamber 29 is inserted into the cylindrical hollow portion of the pin body 40. The other constructions are similar to those in the first embodiment mode.

When the valve pin 39 is arranged in the valve pin chamber 30 of the valve body 28 in this way and the valve pin 39 is pressed by the hit pin 9 pressed by the hammer 10 and moved to the muzzle D side and is moved to the muzzle D side, a clearance is formed between the valve pin flange portion 43 of the pin body 40 and a side face of the valve pin chamber 30 on its gun rear end side. The compressed gas supplied to the valve pin chamber 30 at any time is supplied from the clearance between the valve pin flange portion 43 and the side face of the valve pin chamber 30 on its gun rear end side to the inserting portion 36b of the bullet supplying nozzle 36 inserted into the valve pin 39 via a valve pin side opening 46 of the pin body 40, the interior of the pin body and a nozzle chamber side opening 45. Thus the bullet supplying nozzle 36 is forcibly slid by a gas pressure to the muzzle D side against the biasing force. Then, the inserting portion 36b is dislocated from the cylindrical hollow portion of the valve pin 39. Further, the compressed gas is supplied from an opening on a circumfernetial face on a side of the spring presser 37 to an opening of the bullet supplying nozzle 36 on its muzzle D side via a sleeve-shaped hollow portion so that a muzzle D side end portion of the bullet supplying nozzle 36 can shoot a bullet W moved from the opening 5b of the bullet storage 5.

Further, FIG. 17 shows a third embodiment mode of the constructions of the bullet supplying nozzle 36 and the valve pin 39.

Similar to the first embodiment mode, when the valve pin 39 is pressed by the hit pin 9 in the muzzle D direction in the third embodiment mode, an end tip of the valve pin 39 presses against the bullet supplying nozzle 36 in the muzzle D direction. Namely, as shown in FIG. 6 in the first embodiment mode, the sleeve-shaped through hole 36a of the bullet supplying nozzle 36 is extended from the muzzle D side of the bullet supplying nozzle 36 to the gun rear end side at the same inside diameter. However, in the third embodiment mode, as shown in FIG. 17, a diameter of the through hole 36a on the gun rear end side is set to be larger than that on the muzzle D side so that a step 36c is formed within the bullet supplying nozzle 36. In contrast to this, a diameter of the nozzle inserting portion 41 of the valve pin 39 inserted into the bullet supplying nozzle 36 is set to be slightly smaller than that of the pin body 40 in the first embodiment mode. When the nozzle inserting portion 41 is inserted into the bullet supplying nozzle 36 and the valve pin 39 is moved in the muzzle D direction, the valve pin 39 presses against the bullet supplying nozzle 36 in a step portion between the pin body 40 and the nozzle inserting portion 41 and moves this bullet supplying nozzle 36 in the first embodiment mode. However, in the third embodiment mode, the pin body 40 of the valve pin 39 and the nozzle inserting portion 41 have the same diameter. The other structures of the bullet supplying nozzle 36 and the valve pin 39 are similar to those in the first embodiment mode. The air gun 1 is constructed in a state in which the nozzle inserting portion 41 is inserted from the gun rear end side to the through hole 36a of the bullet supplying nozzle 36. Similar to the operation of the air gun in the first embodiment mode, when the valve pin 39 is pressed by the hit pin 9 by rotating the hammer 10 and is moved in the muzzle D direction, the nozzle inserting portion 41 of the valve pin 39 presses against the step portion within the through hole 36a of the bullet supplying nozzle 36 and moves the bullet supplying nozzle 36 to the muzzle D side. Since the bullet supplying nozzle 36 is moved to the muzzle D side, a muzzle D side end tip of the bullet supplying nozzle 36 supplies a bullet W. Next, a clearance is formed between a gun rear end side face of the bullet supplying nozzle 36 and a gun rear end side face of the bullet supplying nozzle chamber 29. The bullet supplying nozzle 36 is further forcibly moved in the muzzle D direction by a supplied compressed gas. The nozzle inserting portion 41 is dislocated from the through hole 36a of the bullet supplying nozzle 36 in a short time, and the compressed gas supplied into the bullet supplying nozzle chamber 29 is supplied in the muzzle D direction from the through hole 36a of the bullet supplying nozzle 36 so that the bullet W is forcibly shot.

A fourth embodiment mode will next be explained. In the fourth embodiment mode, the bullet supplying nozzle chamber 29 of the valve body 28 is reduced in size and the intermediate portion through hole 32 is set to be long. Further, the gun rear end side of the bullet supplying nozzle 36 is inserted into the intermediate portion through hole 32 and no compressed gas passes through the interior of the bullet supplying nozzle chamber 29. Namely, the bullet supplying nozzle 36 has a projecting portion 36d projected on the gun rear end side and having the same shape as the muzzle side of the bullet supplying nozzle 36 on the gun rear end side from the spring presser 37. The spring presser 37 is approximately arranged in an outer circumference of an intermediate portion of the bullet supplying nozzle 36. The projecting portion 36d is inserted into the intermediate portion through hole 32 in a state in which the spring presser 37 is pressed against a gun rear end side face of the bullet supplying nozzle chamber 29 by the return spring 38. In contrast to this, the valve pin 39 has a construction similar to that in the first embodiment mode, and the nozzle inserting portion 41 is set to have a diameter smaller than that of the pin body 40 so that a step is formed. The inserting portion 41 is inserted into the projecting portion 36d. Accordingly, the bullet supplying nozzle 36 is in a state in which the bullet supplying nozzle 36 is biased on the gun rear end side by the return spring 38. The valve pin 39 is in a state in which the valve pin 39 is pressed on the muzzle D side by the valve pin return spring 44.

Therefore, similar to the first embodiment mode, the hammer 10 is rotated to the muzzle D side and moves the hit pin 9 to the muzzle D side. Thus, the valve pin 39 is also moved to the muzzle D side by the hit pin 9, and the bullet supplying nozzle 36 is moved to the muzzle D side by a step portion between the pin body 41 of the valve pin 39 and the nozzle inserting portion 41 so that a muzzle D side end tip of the bullet supplying nozzle 36 supplies a bullet W. Similar to the first embodiment mode, the compressed gas is supplied into a through hole of the pin body 40 simultaneously when the valve pin 39 is moved. A pressure of the supplied compressed gas is applied to the gun rear end side of the projecting portion 36d to which a nozzle chamber side opening 45 of the inserting portion 41 is opened. The bullet supplying nozzle 36 is forcibly moved to the muzzle D side by this gas pressure. The bullet supplying nozzle 36 is continuously moved to the muzzle D side and the inserting portion 41 of the valve pin 39 is pulled out of the projecting portion 36d in a short time. Thus, the compressed gas is supplied from the gun rear end side of the through hole 36a to the muzzle side through a portion between the inserting portion 41 and a wall face of the intermediate portion through hole 32, and the through hole 36a. Thus, the compressed gas forcibly shoots the bullet W from the muzzle D.

As mentioned above, the valve body 28, the bullet supplying nozzle 36 and the valve pin 39 can be constructed in various shapes. The valve body 28, the bullet supplying nozzle 36 and the valve pin 39 may be constructed in any shapes if the valve pin 39 is moved by the hit pin 9 and the bullet supplying nozzle 36 is pressed and moved by the valve pin 39 and the compressed gas is supplied from the nozzle chamber side opening 45 and the valve pin chamber side opening 46 via the interior of the valve pin 39 so that the compressed gas supplied from the nozzle chamber side opening 45 is supplied to the muzzle side from the through hole 36a of the bullet supplying nozzle 36 and shoots the bullet W, and the compressed gas is supplied from the rear end side through hole 33 to a side of the cylinder 8 and moves the cylinder 8 to the gun rear end side so that shooting of the next bullet can be prepared.

As mentioned above, in accordance with this invention, the valve body, the valve pin and the bullet supplying nozzle inserted into the cylinder act as an opening-closing valve for supplying the compressed gas and a switching valve for supplying the supplied gas to shoot a bullet such that the slide is moved to charge the air gun with the next bullet. The compressed gas can be supplied by the valve body, the valve pin and the bullet supplying nozzle. Accordingly, shooting of the bullet, charging of the next bullet and shooting preparations of the next bullet are made by a single valve mechanism. Further, all of the valve body, the valve pin and the bullet supplying nozzle are arranged in a barrel direction and are stored within the slide so that a space for storing the valve body, the valve pin and the bullet supplying nozzle can be reduced. Further, the supplied compressed gas is stopped in a state in which the compressed gas is already supplied until the valve body. Accordingly, the valve pin can instantaneously stop the gas supply by only supplying the compressed gas to the bullet and the cylinder side so that no compressed gas is unnecessarily consumed.

What is claimed is:

1. An air gun comprising:

a slide arranged in an upper portion of the gun and slidable in parallel with a barrel;

a cylinder portion formed in a sleeve shape opened on a muzzle side and closed on a gun rear end side and fixed to a gun rear end side internal portion of the slide;

a hit pin projected from [the] *an* interior of a hollow portion of the cylinder portion to the gun rear end side and slidably arranged in a muzzle direction;

a valve body fixed to a gun body so as to be located within the hollow portion of the cylinder portion and having a hollow bullet supplying nozzle chamber on the muzzle side, a hollow valve pin chamber on the gun rear end side, and a through hole extending from the muzzle side to the gun rear end side and having a diameter smaller than diameters of the bullet supplying nozzle chamber and the valve pin chamber;

a gas inlet port opened to a sleeve-shaped circumferential face of the valve pin chamber and supplying a compressed gas to the valve pin chamber of the valve body at any time;

a bullet supplying nozzle which is formed in a sleeve shape, and is arranged within the bullet supplying nozzle chamber, and has a muzzle side end tip inserted into a muzzle side through hole of the bullet supplying nozzle chamber, and is biased on the gun rear end side at any time, and is slidable against biasing force; and a valve pin which is formed in a sleeve shape and is arranged within the valve pin chamber, and is biased on the gun rear end side at any time, and has a muzzle side inserted into a muzzle side through hole of the valve pin chamber, and is slidable in an airtight state with respect to the muzzle side through hole of the valve pin chamber, and has a pin body arranged on the gun rear end side and having a valve pin flange portion coming in contact with a side face of the valve pin chamber on its rear end side in an airtight state, and has a nozzle inserting portion arranged on the muzzle side of the pin body and slidably inserted into a gun rear end side opening of the bullet supplying nozzle, and has a pressing portion arranged on the gun rear end side of the pin body and fixed to the pin body and inserted into a through hole of the valve pin chamber on its gun rear end side and projected onto the gun rear end side and having a gun rear end side end tip located to be adjacent to the hit pin and enabling permeation of the compressed gas in a clearance between the pressing portion and the inserted through hole, and has a nozzle chamber side opening arranged in a hollow portion of the pin body and opened to a pin body side face on the gun rear end side of the nozzle inserting portion, and further has a valve pin chamber side opening arranged in the hollow portion of the pin body and opened to the pin body side face on the muzzle side of the pressing portion;

the air gun being constructed such that when the hit pin is pressed on the muzzle side and is slid to the muzzle side, the valve pin is slid to the muzzle side against biasing force, and the airtight state of the valve pin flange portion and the side face of the valve pin chamber on its gun rear end side is released, and the compressed gas supplied from the gas inlet port to the valve pin chamber is supplied to the nozzle chamber side opening and the valve pin chamber side opening from a portion between the side face of the valve pin chamber on its gun rear end side and the valve pin flange portion, and the bullet supplying nozzle is slid to the muzzle side against the biasing force by a pressure of the compressed gas supplied from the nozzle chamber side opening, and a bullet is shot by supplying the compressed gas to the opening on the muzzle side from a clearance formed between an opening on a flange portion side and the nozzle inserting portion, and the cylinder *portion* is moved to the gun rear end side by supplying the compressed gas supplied from *the gas inlet port via* the valve pin chamber side opening to the gun rear end side from the clearance between the pressing portion and the through hole inserting the pressing portion thereinto.

2. An air gun comprising:

a slide arranged in an upper portion of the gun and slidable in parallel with a barrel;

a cylinder portion formed in a sleeve shape opened on a muzzle side and closed on a gun rear end side and fixed to a gun rear end side internal portion of the slide;

a hit pin projected from [the] *an* interior of a hollow portion of the cylinder portion to the gun rear end side and slidably arranged in a muzzle direction;

a valve body fixed to a gun body so as to be located within the hollow portion of the cylinder portion and having a hollow bullet supplying nozzle chamber on the muzzle side, a hollow valve pin chamber on the gun rear end side, and a through hole extending from the muzzle side to the gun rear end side and having a diameter smaller than diameters of the bullet supplying nozzle chamber and the valve pin chamber;

a gas inlet port opened to a sleeve-shaped circumferential face of the valve pin chamber and supplying a compressed gas to the valve body at any time;

a bullet supplying nozzle which is formed in a sleeve shape, and is arranged within the bullet supplying nozzle chamber, and has a muzzle side end tip inserted into a muzzle side through hole of the bullet supplying nozzle chamber, and has a flange portion arranged on the gun rear end side and having the same diameter as the bullet supplying nozzle chamber, and has a sleeve-shaped opening arranged on the gun rear end side and having a diameter smaller than that of a gun rear end side through hole of the bullet supplying nozzle chamber, and is biased on the gun rear end side at any time, and makes the flange portion and an inner circumferential face of the bullet supplying nozzle chamber slidable against biasing force in an airtight state; and a valve pin which is formed in a sleeve shape and is arranged within the valve pin chamber, and is biased on the gun rear end side at any time, and has a muzzle side inserted into a muzzle side through hole of the valve pin chamber, and is slidable in an airtight state with respect to the muzzle side through hole of the valve pin chamber, and has a pin body arranged on the gun rear end side and having a valve pin flange portion coming in contact with a side face of the valve pin chamber on its rear end side in an airtight state, and has a nozzle inserting portion arranged on the muzzle side of the pin body and slidably inserted into a gun rear end side opening of the bullet supplying nozzle, and has a pressing portion arranged on the gun rear end side of the pin body and fixed to the pin body and inserted into a through hole of the valve pin chamber on its gun rear end side and projected onto the gun rear end side and having a gun rear end side end tip located in a position adjacent to the hit pin and enabling permeation of the compressed gas in a clearance between the pressing portion and the inserted through hole, and has a nozzle chamber side opening arranged in a hollow portion of the pin body and opened to a pin body side face on the gun rear end side of the nozzle inserting portion, and further has a valve pin chamber side opening arranged in the hollow portion of the pin body and opened to the pin body side face on the muzzle side of the pressing portion;

the air gun constructed such that when the hit pin is pressed on the muzzle side and is slid to the muzzle side, the valve pin is slid to the muzzle side against biasing force, and the airtight state of the valve pin flange portion and the side face of the valve pin chamber on its gun rear end side is released, and a nozzle chamber side of the pin body presses against the flange portion of the bullet supplying nozzle and slides the bullet supplying nozzle to the muzzle side so as to form a clearance between the flange portion of the bullet supplying nozzle and an inner surface of the bullet supplying nozzle chamber on its gun rear end side, and the compressed gas supplied from the gas inlet port to the valve pin chamber is supplied to the nozzle chamber side opening and the valve pin chamber side opening from a portion between the side face of the valve pin chamber on its gun rear end side and the valve pin flange portion and is also supplied to a clearance formed between the flange portion of the bullet supplying nozzle and the inner surface of the bullet supplying nozzle chamber on its gun rear end side via the nozzle chamber side opening, and the bullet supplying nozzle is slid to the muzzle side against the biasing force by a gas pressure, and a bullet is shot by supplying the compressed gas to the opening on the muzzle side from a clearance formed between an opening of the bullet supplying nozzle on its flange portion side and the nozzle inserting portion, and the cylinder *portion* is moved to the gun rear end side by supplying the compressed gas supplied from *the gas inlet port via* the valve pin chamber side opening to the gun rear end side from the clearance between the pressing portion and the through hole inserting the pressing portion thereinto.

* * * * *